United States Patent
Park

(10) Patent No.: US 12,250,041 B2
(45) Date of Patent: Mar. 11, 2025

(54) METHOD FOR TRANSMITTING AND RECEIVING CHANNEL STATE INFORMATION IN WIRELESS COMMUNICATION SYSTEM, AND DEVICE FOR SAME

(71) Applicant: LG ELECTRONICS INC., Seoul (KR)

(72) Inventor: Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 427 days.

(21) Appl. No.: 17/764,936

(22) PCT Filed: Sep. 29, 2020

(86) PCT No.: PCT/KR2020/013361
§ 371 (c)(1),
(2) Date: Mar. 29, 2022

(87) PCT Pub. No.: WO2021/066534
PCT Pub. Date: Apr. 8, 2021

(65) Prior Publication Data
US 2022/0393736 A1    Dec. 8, 2022

Related U.S. Application Data

(60) Provisional application No. 62/908,583, filed on Sep. 30, 2019.

(51) Int. Cl.
*H04B 7/06* (2006.01)
*H04B 7/0456* (2017.01)

(52) U.S. Cl.
CPC ......... *H04B 7/0626* (2013.01); *H04B 7/0486* (2013.01); *H04B 7/0634* (2013.01); *H04B 7/0639* (2013.01)

(58) Field of Classification Search
None
See application file for complete search history.

(56) References Cited

U.S. PATENT DOCUMENTS

| | | | |
|---|---|---|---|
| 2018/0145737 A1* | 5/2018 | Rahman | H04B 7/0634 |
| 2018/0183503 A1* | 6/2018 | Rahman | H04B 7/0486 |
| (Continued) | | | |

FOREIGN PATENT DOCUMENTS

| | | |
|---|---|---|
| KR | 10-2012-0003781 A | 1/2012 |
| KR | 10-2018-0024014 A | 3/2018 |
| KR | 10-2018-121563 A | 11/2018 |

OTHER PUBLICATIONS

Samsung, "Specification Impacts and Evaluation Results With KP Codebook", R1-153406, 3GPP TSG RAN WG1 Meeting #81, Fukuoka, Japan, Jun. 1, 2015, See Section 2.

*Primary Examiner* — Clemence S Han
(74) *Attorney, Agent, or Firm* — BRYAN CAVE LEIGHTON PAISNER LLP

(57) ABSTRACT

The present invention relates to a method for transmitting and receiving channel state information (CSI) and a device for same. Specifically, the method comprises the steps of: receiving setting information including information about a codebook; receiving a reference signal; measuring CSI on the basis of the reference signal; and transmitting the CSI, wherein the CSI is calculated on the basis of the codebook, which is formed by linear combination on the basis of multiple matrices, a first matrix of the codebook includes a plurality of column vectors set differently for each polarization of antenna ports, and the CSI includes precoding matrix indicators (PMIs) corresponding to indexes of the codebook.

12 Claims, 12 Drawing Sheets

(56) References Cited

U.S. PATENT DOCUMENTS

| | | |
|---|---|---|
| 2018/0309490 A1* | 10/2018 | Rahman .............. H04B 7/0478 |
| 2019/0053089 A1* | 2/2019 | Kwak .................. H04W 72/23 |
| 2019/0229786 A1 | 7/2019 | Huang et al. |
| 2021/0075482 A1* | 3/2021 | Rahman .............. H04B 7/0469 |

* cited by examiner

【FIG. 1】
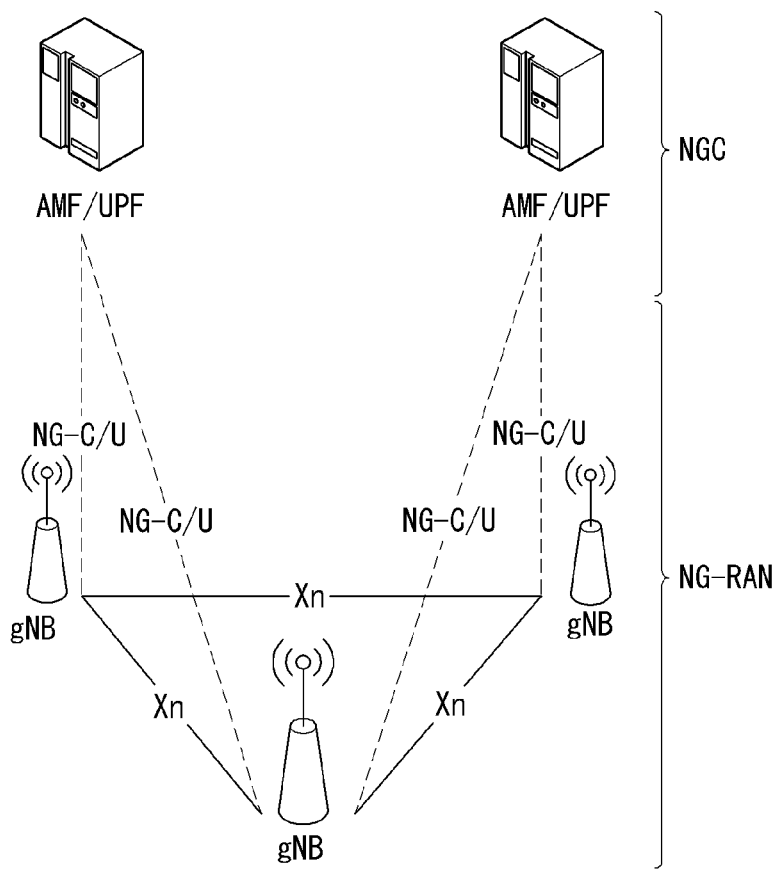
【FIG. 2】
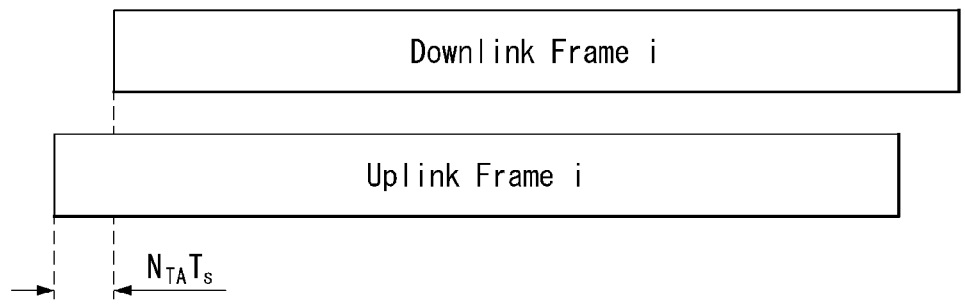

[FIG. 3]
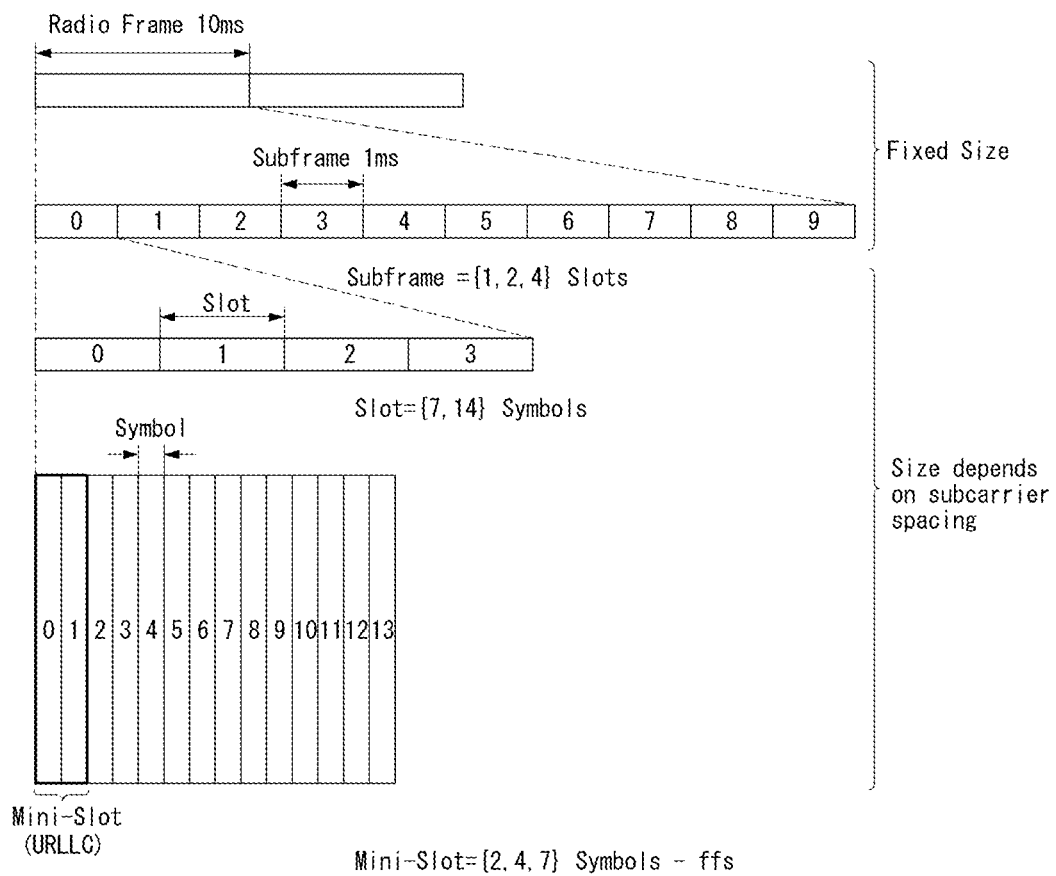

[FIG. 4]
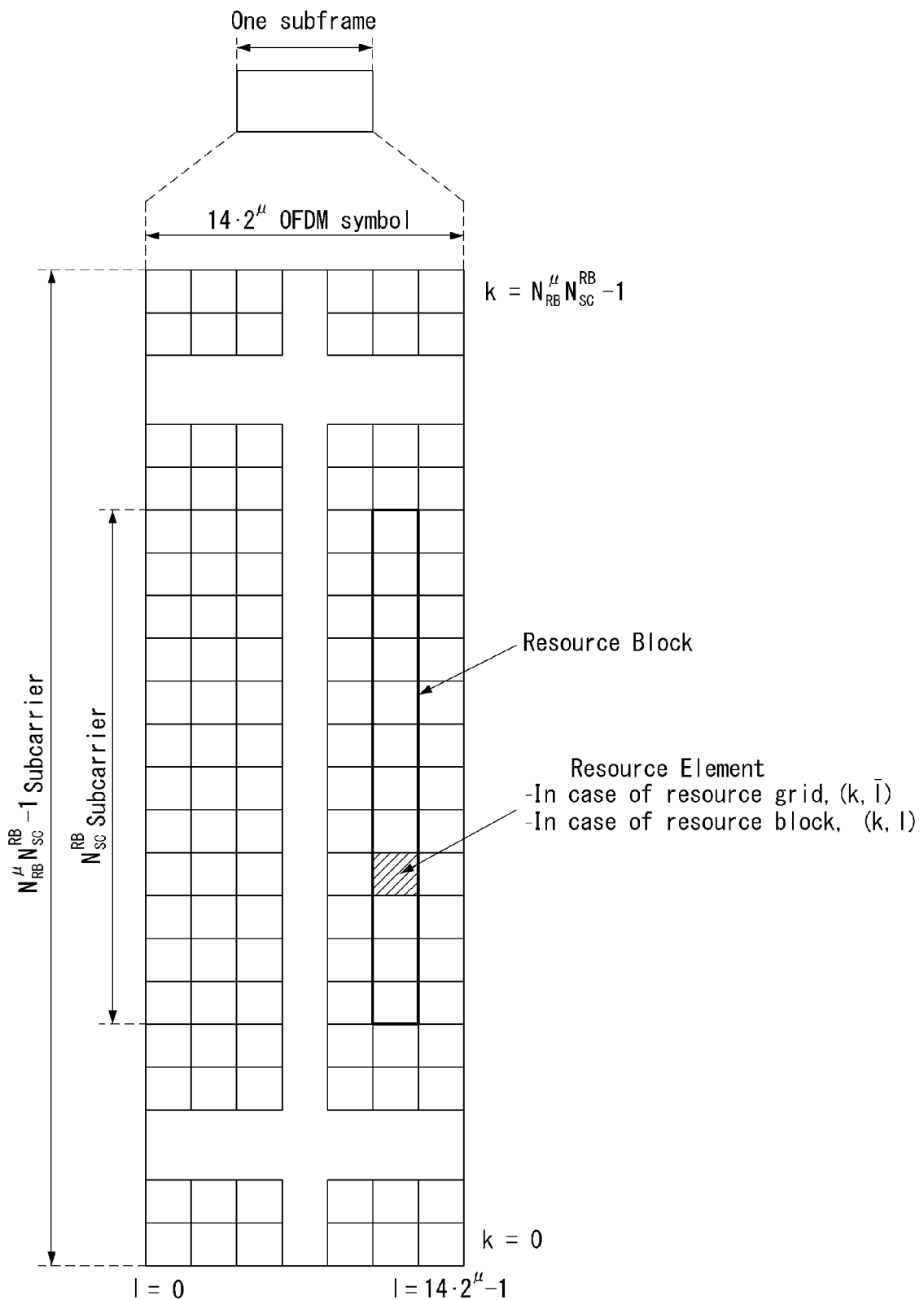

[FIG. 5]
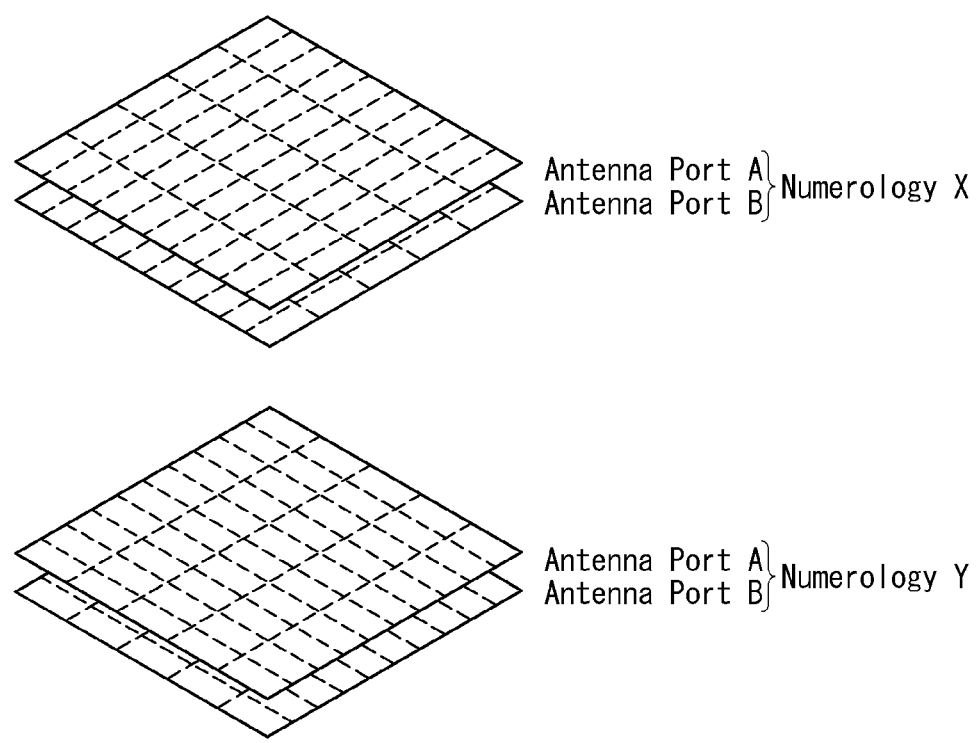

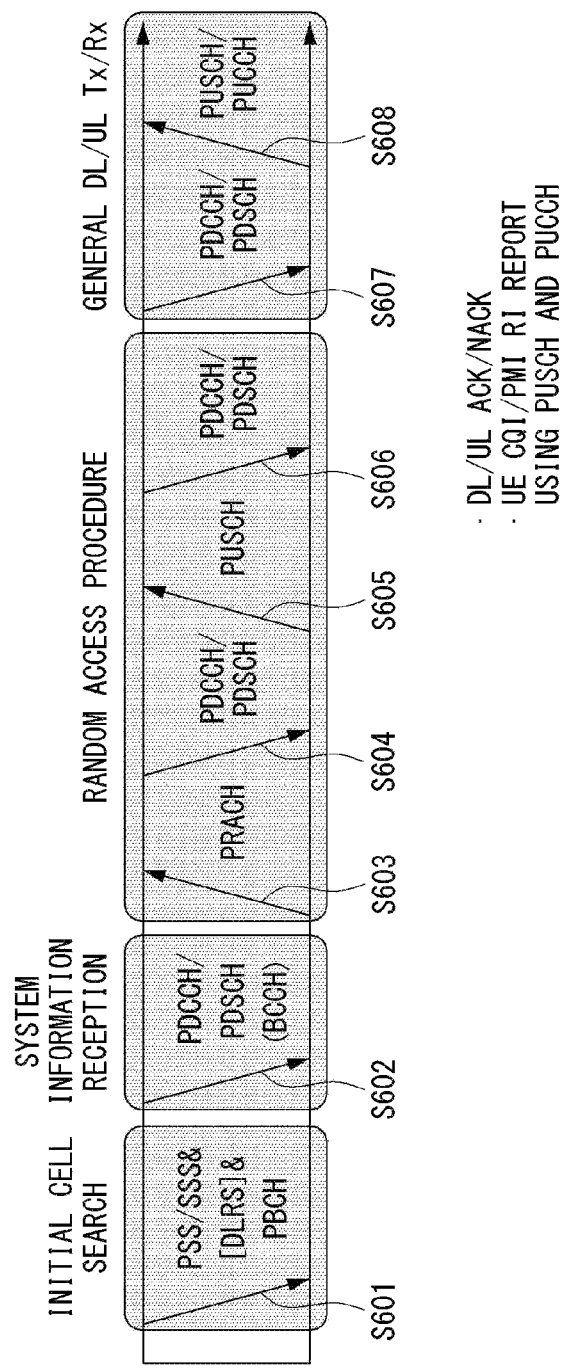

[FIG. 7]
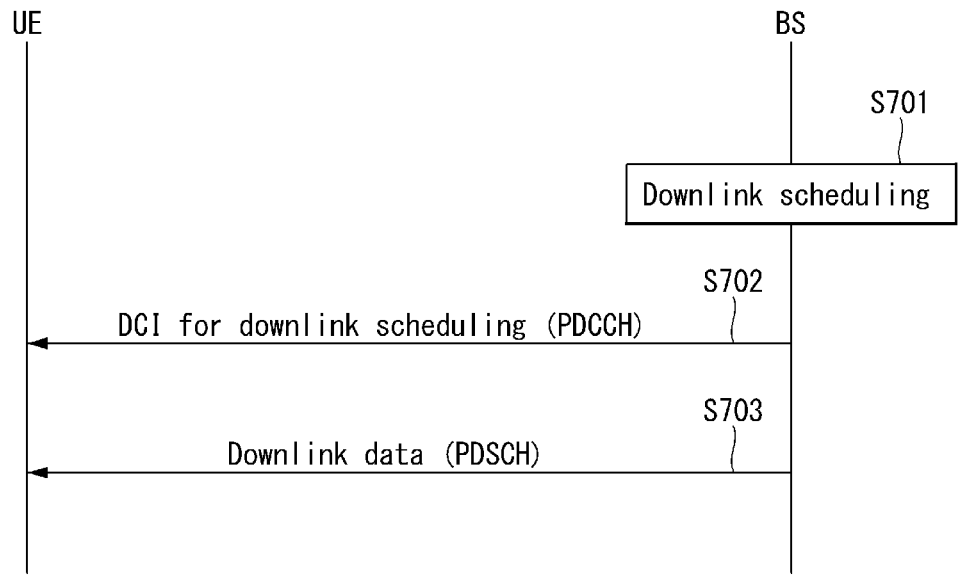
[FIG. 8]
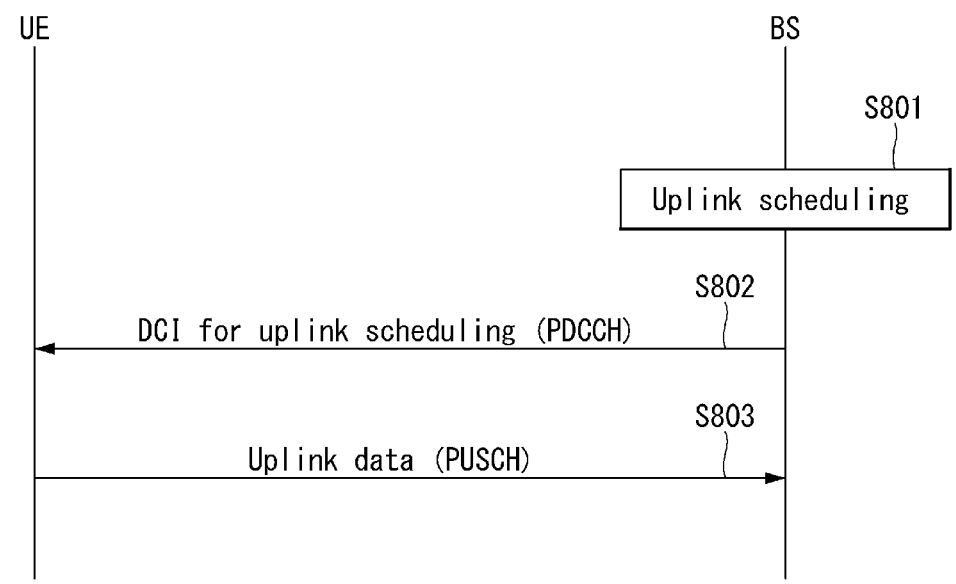

[FIG. 9]
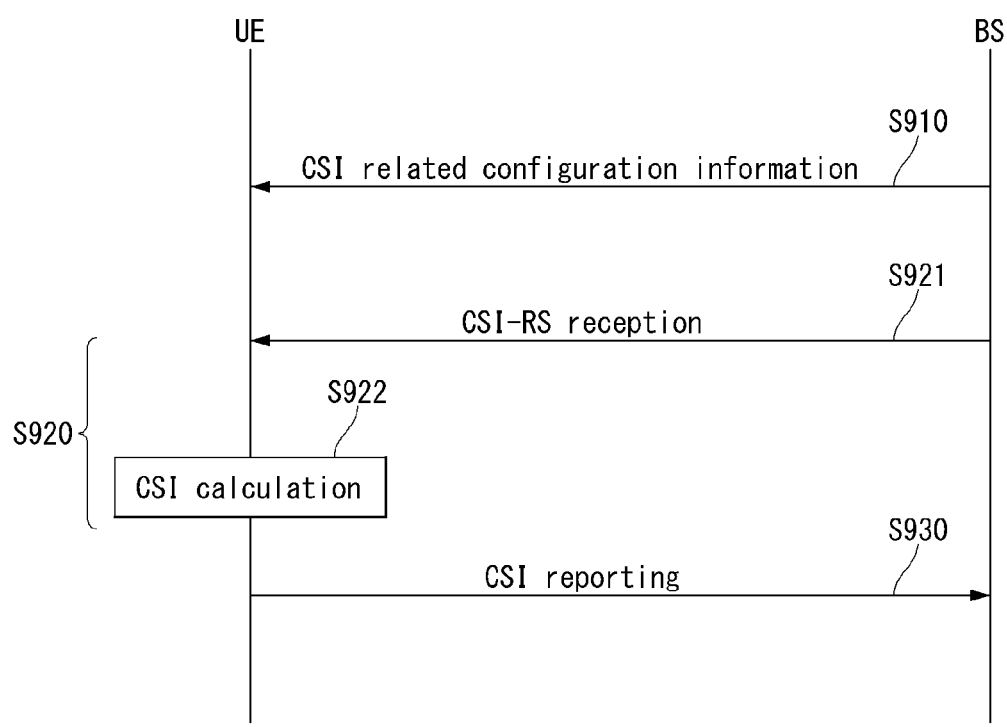

[FIG. 10]
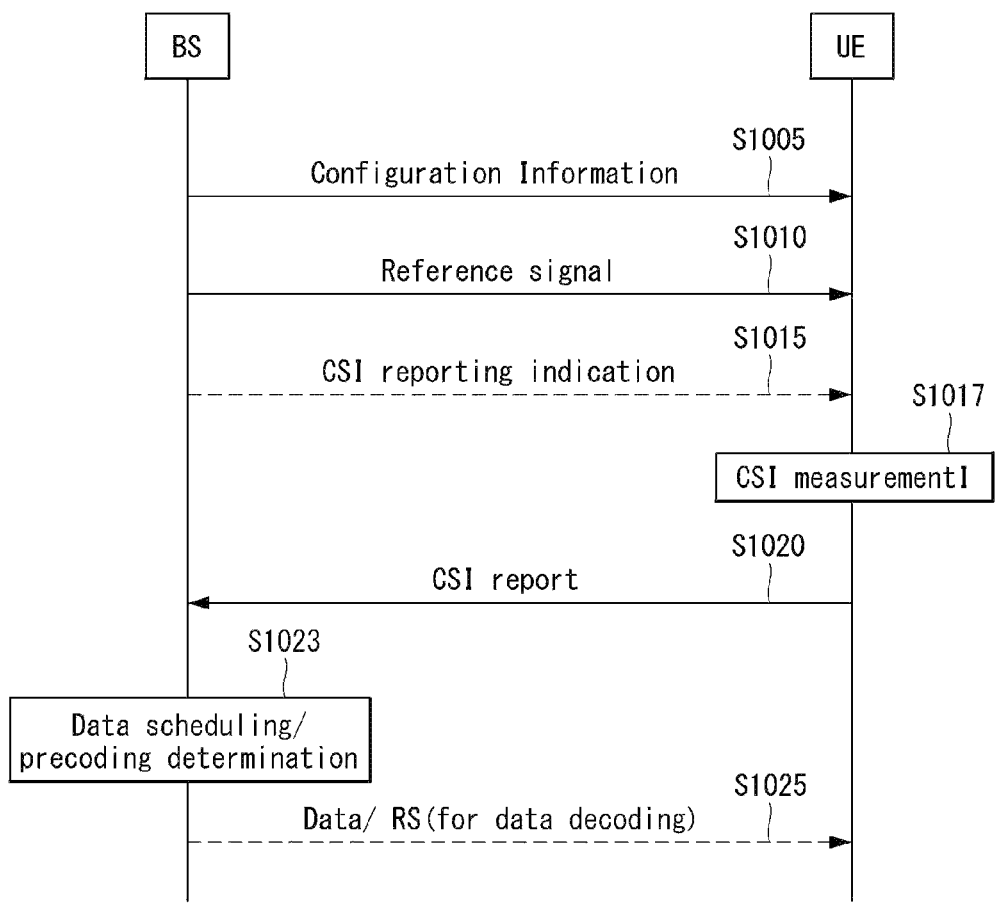

【FIG. 11】
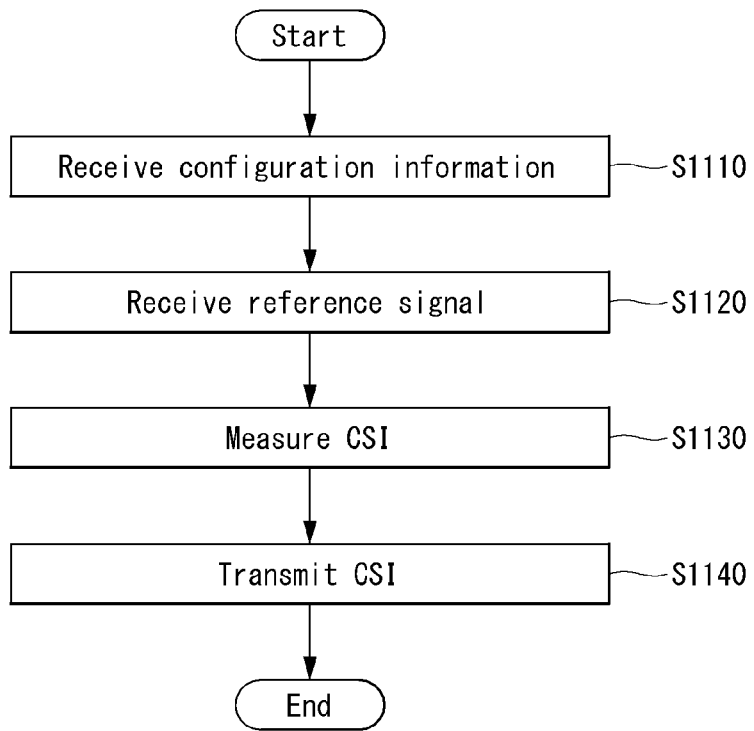
【FIG. 12】
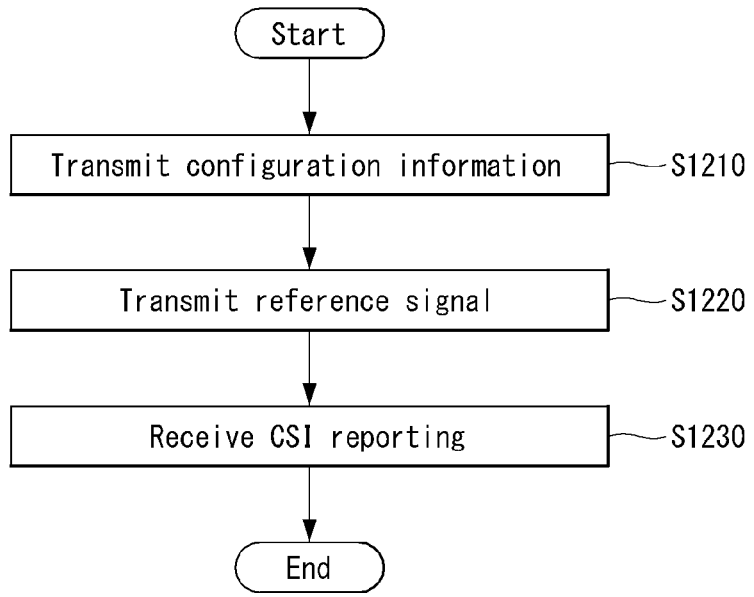

[FIG. 13]
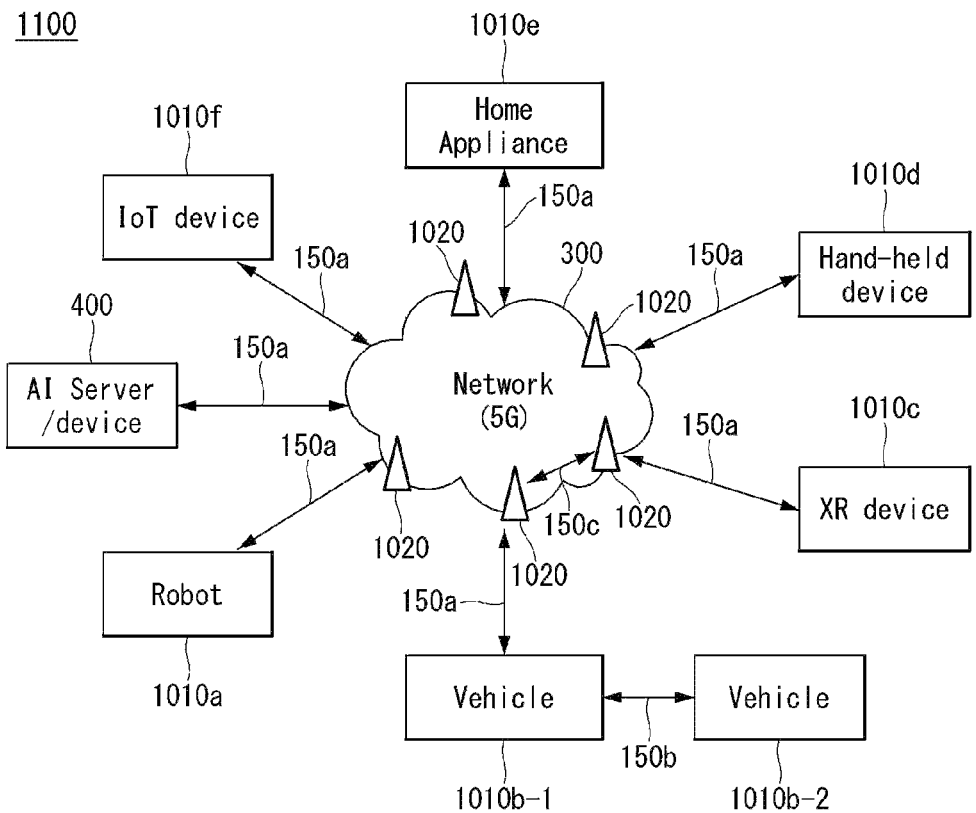
[FIG. 14]
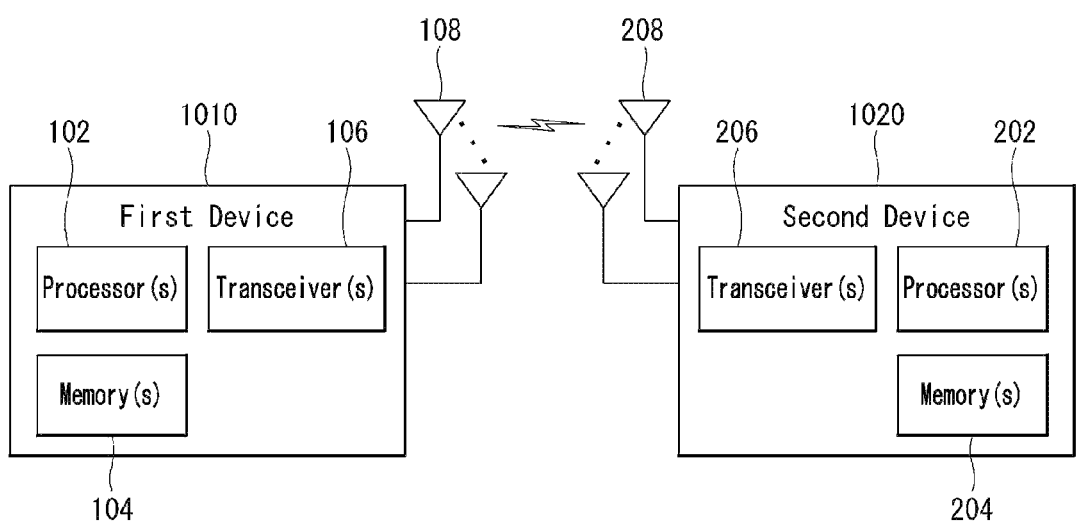

[FIG. 15]
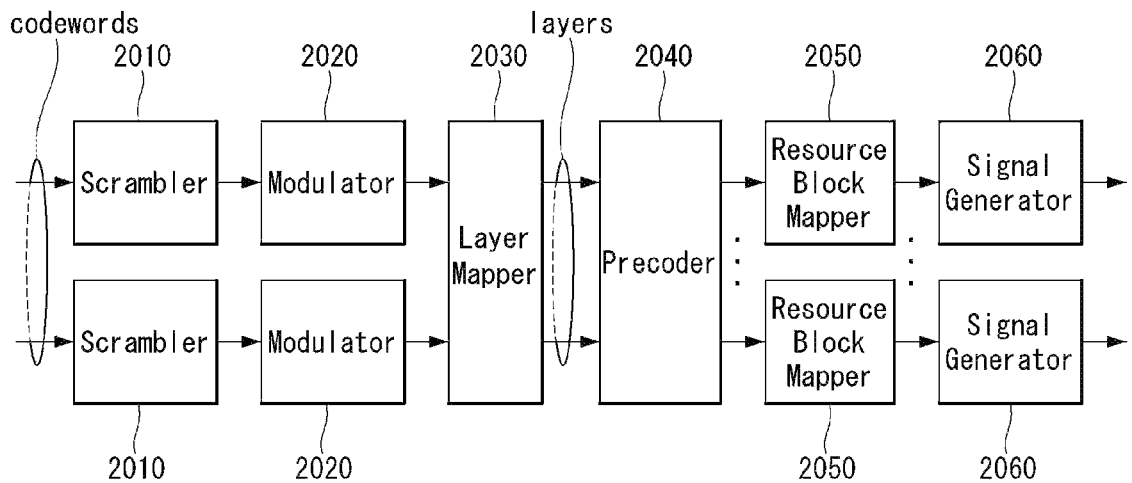
[FIG. 16]
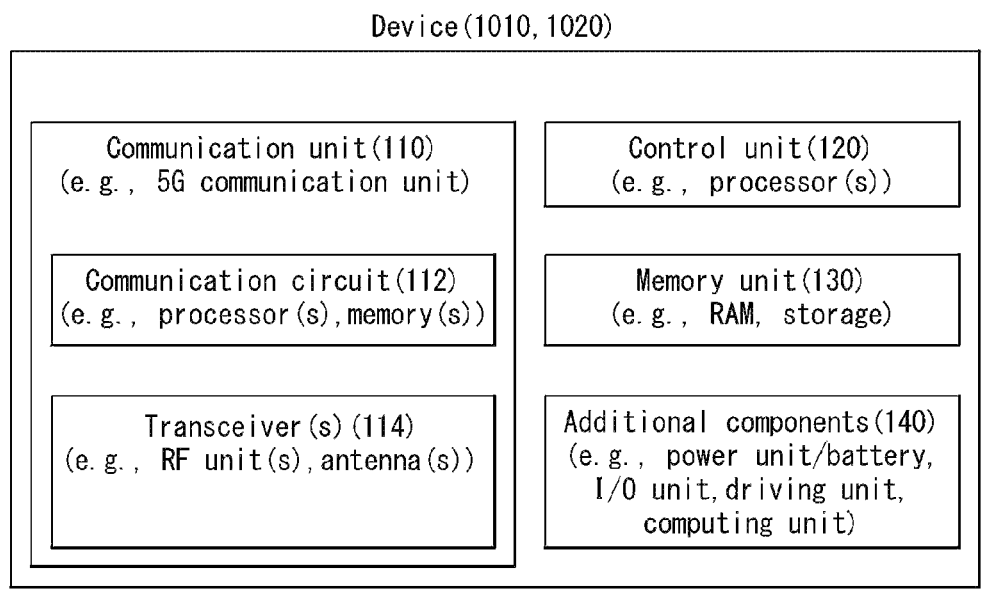

[FIG. 17]
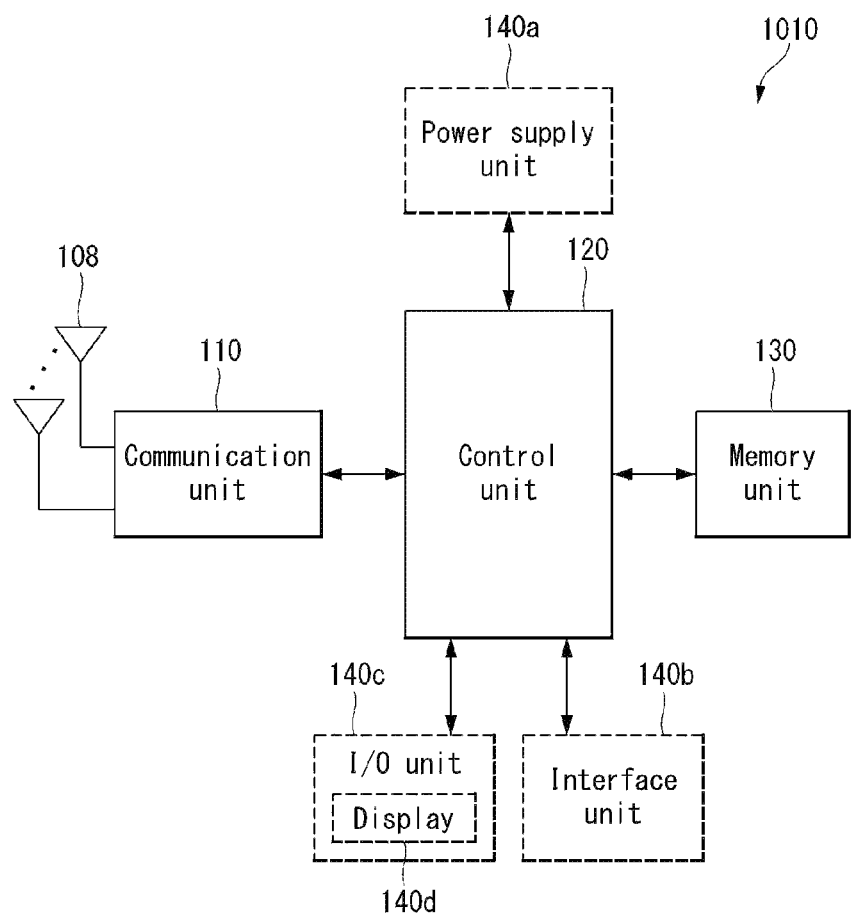

METHOD FOR TRANSMITTING AND RECEIVING CHANNEL STATE INFORMATION IN WIRELESS COMMUNICATION SYSTEM, AND DEVICE FOR SAME

CROSS-REFERENCE TO RELATED APPLICATIONS

This application is the National Stage filing under 35 U.S.C. § 371 of International Application No. PCT/KR2020/013361, filed on Sep. 29, 2020, which claims the benefit of U.S. Provisional Application No. 62/908,583, filed on Sep. 30, 2019, the contents of which are all hereby incorporated by reference herein in their entirety.

TECHNICAL FIELD

The present disclosure relates to a wireless communication system, and more particularly to a method of transmitting and receiving channel state information based on a port selection codebook and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure provides a method of transmitting and receiving channel state information (CSI) in a wireless communication system.

Specifically, the present disclosure provides a method of transmitting and receiving CSI based on a port selection codebook.

The present disclosure also provides a method of constructing a port selection codebook for supporting an upper rank.

The present disclosure also provides a method of reporting port selection information via CSI.

Technical objects to be achieved by the present disclosure are not limited to the aforementioned technical objects, and other technical objects not described above may be evidently understood by a person having ordinary skill in the art to which the present disclosure pertains from the following description.

Technical Solution

In one aspect of the present disclosure, there is provided a method of a user equipment (UE) for reporting channel state information (CSI) in a wireless communication system, the method comprising receiving, from a base station (BS), configuration information including information regarding a codebook; receiving, from the BS, a reference signal; measuring the CSI based on the reference signal; and transmitting, to the BS, the CSI, wherein the CSI is calculated based on the codebook consisting of a linear combination based on a multiple matrix, wherein a first matrix of the codebook includes a plurality of column vectors set differently for each polarization of antenna ports, and wherein the CSI further includes a precoding matrix indicator (PMI) corresponding to indexes of the codebook.

A type of the codebook may be configured to a port selection codebook based on the information regarding the codebook, and at least one of the indexes corresponding to the PMI may be an index indicating antenna ports selected for each polarization.

The plurality of the column vectors may include specific elements with a value of 1, and other elements with a value of 0.

The CSI may further include a rank indicator (RI), and the codebook may be used based on a value of the RI being 3 or more.

The information regarding the codebook may include the number of beams used for the linear combination and size information of the port selection codebook.

The number of the selected antenna ports may be determined based on a specific value determined, by the UE, regardless of the number of beams used for the linear combination included in the information regarding the codebook.

The antenna ports may be selected for each polarization based on a specific step size.

The method may further comprise receiving, from the BS, information regarding the specific step size.

The specific step size may be determined by the UE, and information regarding the specific step size may be included in CSI and transmitted.

The CSI may include selection information regarding antenna ports selected for each layer or layer-group.

The number of bits for reporting the selection information may be proportional to the number of the layer groups, based on the selection of the antenna ports for each layer group.

In another aspect of the present disclosure, there is provided a user equipment (UE) reporting channel state information (CSI) in a wireless communication system, the UE comprising at least one transceiver; at least one processor; and at least one memory coupled to the at least one processor and configured to store instructions for operations executed by the at least one processor, wherein the operations comprise receiving, from a base station (BS), configuration information including information regarding a codebook; receiving, from the BS, a reference signal; measuring the CSI based on the reference signal; and transmitting, to the BS, the CSI, wherein the CSI is calculated based on the codebook consisting of a linear combination based on a multiple matrix, wherein a first matrix of the codebook includes a plurality of column vectors set differently for each polarization of antenna ports, and wherein the CSI further includes a precoding matrix indicator (PMI) corresponding to indexes of the codebook.

In another aspect of the present disclosure, there is provided a method of a base station (BS) for receiving channel state information (CSI) in a wireless communication system, the method comprising transmitting, to a user equipment (UE), configuration information including information regarding a codebook; transmitting, to the UE, a reference signal (RS); and receiving, from the UE, the CSI, wherein the CSI is calculated based on the codebook consisting of a linear combination based on a multiple matrix, wherein a first matrix of the codebook includes a plurality of column vectors set differently for each polarization of antenna ports, and wherein the CSI further includes a precoding matrix indicator (PMI) corresponding to indexes of the codebook.

In another aspect of the present disclosure, there is provided a base station (BS) receiving channel state information (CSI) in a wireless communication system, the BS comprising at least one transceiver; at least one processor; and at least one memory coupled to the at least one processor and configured to store instructions for operations executed by the at least one processor, wherein the operations comprise transmitting, to a user equipment (UE), configuration information including information regarding a codebook; transmitting, to the UE, a reference signal (RS); and receiving, from the UE, the CSI; wherein the CSI is calculated based on the codebook consisting of a linear combination based on a multiple matrix, wherein a first matrix of the codebook includes a plurality of column vectors set differently for each polarization of the antenna ports, and wherein the CSI further includes a precoding matrix indicator (PMI) corresponding to indexes of the codebook.

In another aspect of the present disclosure, there is provided a device comprising at least one memory; and at least one processor operatively connected to the at least one memory, wherein the at least one processor is configured to allow the device to receive configuration information including information regarding a codebook, receive a reference signal, measure channel state information (CSI) based on the reference signal, and transmit the CSI, wherein the CSI is calculated based on the codebook consisting of a linear combination based on a multiple matrix, wherein a first matrix of the codebook includes a plurality of column vectors set differently for each polarization of antenna ports, and wherein the CSI further includes a precoding matrix indicator (PMI) corresponding to indexes of the codebook.

In another aspect of the present disclosure, there is provided at least one non-transitory computer readable medium storing one or more instructions, the one or more instructions executable by at least one processor allow a user equipment (UE) to receive configuration information including information regarding a codebook, receive a reference signal, measure channel state information (CSI) based on the reference signal, and transmit the CSI, wherein the CSI is calculated based on the codebook consisting of a linear combination based on a multiple matrix, wherein a first matrix of the codebook includes a plurality of column vectors set differently for each polarization of antenna ports, and wherein the CSI further includes a precoding matrix indicator (PMI) corresponding to indexes of the codebook.

Advantageous Effects

Embodiments of the present disclosure can construct a codebook capable of increasing flexibility of port selection for higher ranks.

Embodiments of the present disclosure can perform a different port selection for each polarization of antenna ports and report a result of selection via CSI.

Embodiments of the present disclosure can select consecutive ports, select ports with a specific step size (i.e., ports at regular intervals), and report information for the selected ports via CSI.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 is a flow chart illustrating an example of a CSI related procedure to which methods described in the present disclosure are applicable.

FIG. 10 illustrates an example of signalling between a user equipment (UE) and a base station (BS) to which methods and/or embodiments described in the present disclosure are applicable.

FIG. 11 illustrates an example of an operation flow chart of a UE reporting channel state information (CSI) to which methods and/or embodiments described in the present disclosure are applicable.

FIG. 12 illustrates an example of an operation flow chart of a BS receiving CSI reporting to which methods and/or embodiments described in the present disclosure are applicable.

FIG. 13 illustrates a communication system applied to the present disclosure.

FIG. 14 illustrates a wireless device which may be applied to the present disclosure.

FIG. 15 illustrates a signal processing circuit for a transmit signal.

FIG. 16 illustrates another example of a wireless device applied to the present disclosure.

FIG. 17 illustrates a portable device applied to the present disclosure.

MODE FOR INVENTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
   36.211: Physical channels and modulation
   36.212: Multiplexing and channel coding
   36.213: Physical layer procedures
   36.300: Overall description
   36.331: Radio Resource Control (RRC)

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in a table 1.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu n_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu} N_{sc}^{RB}-1$ is an index on a frequency domain, and l=0, . . . , $2^{\mu} N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k, l̄) for the numerology μ and the antenna port p corresponds to a complex value $a_{k,l̄}^{(p,\mu)}$. When there is no risk for confusion or when a specific antenna port or numerology is not specified, the indices p and μ may be dropped, and as a result, the complex value may be $a_{k,l̄}(p)$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

DL and UL Transmission/Reception Operation

Downlink Transmission/Reception Operation

FIG. 7 illustrates an example of a downlink transmission and reception operation.

Referring to FIG. 7, the eNB may schedule downlink transmission such as the frequency/time resource, the transport layer, a downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

For 2 codeword transmission (e.g., maxNrofCodeWordsScheduledByDCI=2), MCS/NI/RV field may be configured for each of TB 1 and TB 2.

In particular, according to each state/index indicated in an antenna port(s) field, the number of DMRS ports may be scheduled, and single-user (SU)/multi-user (MU) transmission scheduling is also available. Specifically, tables/rules for interpretation of the antenna port(s) field value may be defined based on 'dmrs-Type' and 'maxLength'. The number of DMRS CDM group without data/DMRS port(s)/number of front-load symbols corresponding to one CW/two CWs may be determined depending on the antenna port(s) field value. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 1_1, a DMRS configuration type may be configured by higher layer parameter "dmrs-Type" in the UE and the DMRS configuration type is used for receiving the PDSCH.

Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S901). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S902). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S903). When the UE detects a PDCCH including DCI format 0_0 or 0_1, the UE may transmit the corresponding PUSCH according to the indication by the corresponding DCI. two schemes(Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "nonCodebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (OCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability, e.g., maxNumberActiveTCI-PerBWP.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

The standard content related to the above-described QCL may be the same Table 6 below (e.g. see 3gpp TS 38.214. section 5.1.5.).

TABLE 5

When the HARQ-ACK corresponding to the PDSCH carrying the activation command
is transmitted in slot n, the indicated mapping between TCI states and codepoints
of the DCI field 'Transmission Configuration Indication' should be applied starting from
slot n + $3N_{slot}^{subframe, \mu}$ + 1. After a UE receives an initial higher layer configuration
of TCI states and before reception of the activation command, the UE may assume
that the DM-RS ports of PDSCH of a serving cell are quasi co-located with the
SS/PBCH block determined in the initial access procedure with respect to 'QCL-
TypeA', and when applicable, also with respect to 'QCL-TypeD'.
If a UE is configured with the higher layer parameter tci-PresentInDCI that is set as
'enabled' for the CORESET scheduling the PDSCH, the UE assumes that the TCI
field is present in the DCI format 1_1 of the PDCCH transmitted on the CORESET.
If tci-PresentInDCI is not configured for the CORESET scheduling the PDSCH or
the PDSCH is scheduled by a DCI format 1_0, and the time offset between the
reception of the DL DCI and the corresponding PDSCH is equal to or greater than at
hreshold timeDurationForQCL, where the threshold is based on reported UE capability
[13, TS 38.306], for determining PDSCH antenna port quasi co-location, the UE
assumes that the TCI state or the QCL assumption for the PDSCH is identical to the
TCI state or QCL assumption whichever is applied for the CORESET used for the
PDCCH transmission.
If the tci-PresentInDCI is set as 'enabled', the TCI field in DCI in the scheduling
component carrier points to the activated TCI states in the scheduled component carrier
or DL BWP and when the PDSCH is scheduled by DCI format 1_1, the UE shall
use the TCI-State according to the value of the 'Transmission Configuration
Indication' field in the detected PDCCH with DCI for determining PDSCH antenna port
quasi co-location. The UE may assume that the DM-RS ports of PDSCH of a serving
cell are quasi co-located with the RS(s) in the TCI state with respect to the QCL
type parameter(s) given by the indicated TCI state if the time offset between the
reception of the DL DCI and the corresponding PDSCH is equal to or greater than
a threshold timeDurationForQCL, where the threshold is based on reported UE
capability [13, TS 38.306]. When the UE is configured with a single slot PDSCH, the
indicated TCI state should be based on the activated TCI states in the slot with the
scheduled PDSCH. When the UE is configured with a multi-slot PDSCH, the indicated
TCI state should be based on the activated TCI states in the first slot with the
scheduled PDSCH, and UE shall expect the activated TCI states are the same across
the slots with the scheduled PDSCH. When the UE is configured with CORESET
associated with a search space set for cross-carrier scheduling, the UE expects tci-Pr
esentInDci is set as 'enabled' for the CORESET, and if one or more of the TCI states
configured for the serving cell scheduled by the search space set contains 'QCL-
TypeD', the UE expects the time offset between the reception of the detected PDCCH
in the search space set and the corresponding PDSCH is larger than or equal to
the threshold timeDurationForQCL.
For both the cases when tci-PresentInDCI is set to 'enabled' and tci-PresentInDCI is
not configured in RRC connected mode, if the offset between the reception of the
DL DCI and the corresponding PDSCH is less than the threshold timeDurationForQCL, TABLE 5-continued the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE. In this case, if the QCL-TypeD of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If none of configured TCI states contains 'QCL-TypeD', the UE shall obtain the other QCL assumptions from the indicated TCI states for its scheduled PDSCH irrespective of the time offset between the reception of the DL DCI and the corresponding PDSCH.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS. Initialization/update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

Channel State Information (CSI)-Related Procedure

In the new radio (NR) system, a channel state information-reference signal (CSI-RS) is used for time/frequency tracking, CSI computation, layer 1(L1)-reference signal received power (RSRP) computation, or mobility. The CSI computation is related to CSI acquisition, and L1-RSRP computation is related to beam management (BM).

Hereinafter, operation of a UE with respect to the CSI-related procedure will be described.

FIG. 9 is a flowchart illustrating an example of a CSI-related procedure.

Referring to FIG. 9, to perform one of the above purposes of a CSI-RS, a terminal (e.g., a UE) receives CSI related configuration information from a base station (e.g., a general node B (gNB)) through a radio resource control (RRC) signaling(S910).

The CSI-related configuration information may include at least one of CSI interference management (IM) resource-related information, CSI measurement configuration-related information, CSI resource configuration-related information, CSI-RS resource-related information, or CSI reporting configuration-related information.

The CSI-IM resource-related information may include CSI-IM resource information, CSI-IM resource set information, etc. The CSI-IM resource set is identified by a CSI-IM resource set ID (identifier), and one resource set includes at least one CSI-IM resource. Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set. That is, the CSI resource configuration-related information includes a CSI-RS resource set list, and the CSI-RS resource set list may include at least one of a NZP CSI-RS resource set list, a CSI-IM resource set list, or a CSI-SSB resource set list. The CSI resource configuration-related information may be expressed as CSI-ResourceConfig IE. The CSI-RS resource set is identified by a CSI-RS resource set ID, and one resource set includes at least one CSI-RS resource. Each CSI-RS resource is identified by a CSI-RS resource ID.

Table 6 shows an example of NZP CSI-RS resource set IE. As shown in Table 6, parameters (e.g.: the BM-related parameter repetition, and the tracking-related parameter trs-Info indicative of (or indicating) a purpose of a CSI-RS may be set for each NZP CSI-RS resource set.

TABLE 6

```
-- ASN1START
-- TAG-NZP-CSI-RS-RESOURCESET-START
NZP-CSI-RS-ResourceSet ::=        SEQUENCE {
    nzp-CSI-ResourceSetId              NZP-CSI-RS-ResourceSetId,
    nzp-CSI-RS-Resources               SEQUENCE (SIZE (1..maxNrofNZP-CSI-RS-
ResourcesPerSet)) OF NZP-CSI-RS-ResourceId,
    repetition                         ENUMERATED { on, off }
    aperiodicTriggeringOffset          INTEGER (0..4)
    trs-Info                           ENUMERATED {true}
    ...
}
```

TABLE 6-continued

-- TAG-NZP-CSI-RS-RESOURCESET-STOP
-- ASN1STOP

In addition, the parameter repetition corresponding to a higher layer parameter corresponds to "CSI-RS-ResourceRep" of L1 parameter.

The CSI reporting configuration related information includes the parameter reportConfigType indicative of a time domain behavior and the parameter reportQuantity indicative of a CSI-related quantity to be reported. The time domain behavior may be periodic, aperiodic, or semi-persistent.

The CSI reporting configuration-related information may be represented as CSI-ReportConfig IE, and Table 7 shows an example of the CSI-ReportConfig IE.

In addition, the UE measures CSI based on configuration information related to the CSI (S820). Measuring the CSI may include (1) receiving a CSI-RS by the UE (S821) and (2) computing CSI based on the received CSI-RS (S822), a detailed description thereof will be scribed later.

resource element (RE) mapping of CSI-RS resources of the CSI-RS is performed in time and frequency domains by higher layer parameter CSI-RS-ResourceMapping.

Table 8 shows an example of CSI-RS-ResourceMapping IE.

TABLE 7

```
-- ASN1START
-- TAG-CSI-RESOURCECONFIG-START
    CSI-ReportConfig ::=               SEQUENCE {
        reportConfigId                     CSI-ReportConfigId,
        carrier                            ServCellIndex           OPTIONAL, - - Need S
        resourcesForChannelMeasurement     CSI-ResourceConfigId,
        csi-IM-ResourcesForInterference    CSI-ResourceConfigId    OPTIONAL, - - Need R
        nzp-CSI-RS-ResourcesForInterference CSI-ResourceConfigId   OPTIONAL, - - Need R
        reportConfigType                   CHOICE {
            periodic                           SEQUENCE {
                reportSlotConfig                   CSI-ReportPeriodicityAndOffset,
                pucch-CSI-ResourceList             SEQUENCE (SIZE
(1..maxNrofBWPs)) OF PUCCH-CSI-Resource
            },
            semiPersistentOnPUCCH              SEQUENCE {
                reportSlotConfig                   CSI-ReportPeriodicityAndOffset,
                pucch-CSI-ResourceList             SEQUENCE (SIZE
(1..maxNrofBWPs)) OF PUCCH-CSI-Resource
            ),
            semiPersistentOnPUSCH              SEQUENCE {
                reportSlotConfig                   ENUMERATED {s15, s110, s120,
s140, s180, s1160, s1320},
                reportSlotOffsetList               SEQUENCE (SIZE (1.. maxNrofUL-
Allocations)) OF INTEGER(0..32),
                p0alpha                            P0-PUSCH-AlphaSetId
            },
            aperiodic                          SEQUENCE {
                reportSlotOffsetList               SEQUENCE (SIZE (1..maxNrofUL-
Allocations)) OF INTEGER(0..32)
            }
        },
        reportQuantity                     CHOICE {
            none                               NULL,
            cri-RI-PMI-CQI                     NULL,
            cri-RI-i1                          NULL,
            cri-RI-i1-CQI                      SEQUENCE {
                pdsch-BundleSizeForCSI             ENUMERATED {n2, n4}
OPTIONAL
            }
            cri-RI-CQI                         NULL,
            cri-RSRP                           NULL,
            ssb-Index-RSRP                     NULL,
            cri-RI-LI-PMI-CQI                  NULL
        },
```

TABLE 8

```
-- ASN1START
-- TAG-CSI-RS-RESOURCEMAPPING-START
CSI-RS-ResourceMapping ::=            SEQUENCE {
    frequencyDomainAllocation         CHOICE {
        row1                              BIT STRING (SIZE (4)),
        row2                              BIT STRING (SIZE (12)),
        row4                              BIT STRING (SIZE (3)),
        other                             BIT STRING (SIZE (6))
    },
    nrofPorts                         ENUMERATED {p1,p2,p4,p8,p12,p16,p24,p32},
    firstOFDMSymbolInTimeDomain       INTEGER (0..13),
    firstOFDMSymbolInTimeDomain2      INTEGER (2..12)
    cdm-Type                          ENUMERATED {noCDM, fd-CDM2, ccm4-FD2-TD2, odm8-
FD2-TD4},
    density                           CHOICE {
        dot5                              ENUMERATED {evenPRBs, oddPRBs},
        one                               NULL,
        three                             NULL,
        spare                             NULL
    },
    freqBand                          CSI-FrequencyOccupation,
    ...
}
```

In Table 8, a density (D) indicates a density of CSI-RS resources measured in a RE/port/physical resource block (PRB), and nrofPorts indicates the number of antenna ports.

The UE reports the measured CSI to the base station (S930).

Herein, when a quantity of CSI-ReportConfig in Table 7 is set to "none (or No report)", the UE may skip the reporting.

However, even when the quantity is set to "none (or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

CSI Measurement

The NR system supports more flexible and dynamic CSI measurement and reporting. The CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported. To configure CSI-IM, four port NZP CSI-RS RE patterns are used.

CSI-IM-based IMR of NR has a design similar to CSI-IM of LTE and is configured independent of ZP CSI-RS resources for PDSCH rate matching. In addition, each port in the NZP CSI-RS-based IMR emulates an interference layer having (a desirable channel and) a pre-coded NZP CSI-RS. This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList"). Herein, a CSI resource setting corresponds to CSI-RS-resourcesetlist. Herein, S represents the number of configured CSI-RS resource sets. Herein, configuration of S≥1 CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id. In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent. The number S of CSI-RS resource sets configured for periodic and semi-persistent CSI resource settings is restricted to "1". A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConfig.

When the UE is configured with a plurality of CSI-ResourceConfig having the same CSI-IM resource ID, the same time domain behavior is configured for the CSI-ResourceConfig.

Then, one or more CSI resource settings for channel measurement (CM) and interference measurement (IM) are configured through higher layer signaling.

A CSI-IM resource for interference measurement.

An NZP CSI-RS resource for interference measurement.

An NZP CSI-RS resource for channel measurement.

That is, a channel measurement resource (CMR) may be an NZP CSI-RS for CSI acquisition, and an interference measurement resource (IMR) may be an NZP CSI-RS for CSI-IM and for IM.

Herein, CSI-IM (or a ZP CSI-RS for IM) is primarily used for inter-cell interference measurement.

In addition, an NZP CSI-RS for IM is primarily used for intra-cell interference measurement from multi-user.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for interference measurement performed on CSI-IM.

CSI Computation

If interference measurement is performed on CSI-IM, each CSI-RS resource for channel measurement is associated with a CSI-RS resource in a corresponding resource set by an order of CSI-RS resources and CSI-IM resources.

When interference measurement is performed in NZP CSI-RS, the UE does not expect that more than 1 NZP CSI-RS resource is configured in the resource set associated with the resource setting for channel measurement.

A UE configured with the higher layer parameter 'nzp-CSI-RS-ResourcesForInterference' may expect 18 or less NZP CSI-RS ports in the NZP CSI-RS resource set.

For CSI measurement, the UE assumes the following.
Each NZP CSI-RS port configured for interference measurement corresponds to an interference transport layer.
All interference transport layers of the NZP CSI-RS port for interference measurement consider the EPRE (energy per resource element) ratio.
NZP CSI-RS resource for channel measurement, NZP CSI-RS resource for interference measurement or other interference signals on RE(s) of CSI-IM resource for interference measurement.

CSI Reporting

For CSI reporting, time and frequency resources available for an UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with $N \geq 1$ CSI-ReportConfig reporting setting, $M \geq 1$ CSI-ResourceConfig resource setting, and a list of one or two trigger states (provided by aperiodicTriggerStateList and semiPersistentOnPUSCH-TriggerStateList) by a higher layer. In the aperiodicTriggerStateList, each trigger state includes a channel and a list of associated CSI-ReportConfigs selectively indicative of Resource set IDs for interference. In the semiPersistentOnPUSCH-TriggerStateList, each trigger state includes one associated CSI-ReportConfig.

In addition, a time domain behavior of CSI reporting supports periodic, semi-persistent, and aperiodic CSI reporting.

i) The periodic CSI presorting is performed on a short PUCCH and a long PUCCH. A periodicity and a slot offset of the periodic CSI reporting may be configured by RRC and refer to CSI-ReportConfig IE.

ii) SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC. For SP CSI reporting on a PUSCH, a separated RNTI (SP-CSI C-RNTI) is used.

DCI format 0_1 may include a CSI request field and activate/deactivate a specific configured SP-CSI trigger state. In addition, SP CSI reporting is activated/deactivated identically or similarly to a mechanism having data transmission on a SPS PUSCH.

iii) Aperiodic CSI reporting is performed on a PUSCH and triggered by DCI. In this case, information related to the trigger of the aperiodic CSI reporting may be transmitted/indicated/configured via MAC-CE.

In the case of AP CSI having an AP CSI-RS, an AP CSI-RS timing is configured by RRC. Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR. Instead, NR restricts configuring specific CSI reporting on a short/long PUCCH, and a CSI omission rule is defined. Regarding an AP CSI reporting timing, PUSCH symbol/slot location is dynamically indicated by DCI. In addition, candidate slot offsets are configured by RRC. Regarding CSI reporting, a slot offset(Y) is configured for each reporting setting. Regarding UL-SCH, a slot offset K2 is configured separately.

Two CSI latency classes (low latency class and high latency class) are defined in terms of CSI computation complexity. The low latency CSI is WB CSI that includes up to 4-ports Type-I codebook or up to 4-ports non-PMI feedback CSI. The high latency CSI is a CSI other than the low latency CSI. Regarding a normal UE, (Z, Z') is defined in a unit of OFDM symbols. Z represents the minimum CSI processing time after receiving CSI triggering DCI and before performing CSI reporting. Z' represents the minimum CSI processing time after receiving CSI-RS about a channel/interference and before performing CSI reporting.

Additionally, the UE reports the number of CSI which can be calculated at the same time.

Table 9 below is the contents related to CSI reporting configuration defined in TS38.214.

TABLE 9

5.2.1.4 Reporting configurations
The UE shall calculate CSI parameters (if reported) assuming tire following dependencies between CSI parameters (if reported)
LI shall be calculated conditioned on the reported CQI, PMI, RI and CRI
CQI shall be calculated conditioned on the reported PMI, RI and CRI
PMI shall be calculated conditioned on the reported RI and CRI
RI shall be calculated conditioned on the reported CRI.
The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1 4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Subclause 5.2.1.5.2. Aperiodic CSI-RS is configured and triggered/activated as described in Subclause 5.2.1.5.1.
Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally,activation command [10, TS 38.321] possible as defined in Subclause 5.2.1.5.1. |
| Aperiodic CSI-RS | Not Supported | Not Supported | Triggered by DCI; additionally,activation command [10, TS 38.321] possible as defined in Subclause 5.2.1,5.1. |

Table 10 below is information related to activation/deactivation/trigger by MAC-CE related to Semi-Persistent/Aperiodic CSI reporting defined in TS38.321.

TABLE 10

5.18.2 Activation/Deactivation of Semi-persistent CSI-RS/CSI-IM resource set

The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.12. The configured Semi-persistent CSI-RS/CSI-IM resource sets are initially deactivated upon configuration and after a handover.
The MAC entity shall:
  1> if the M AC entity receives an SP CSI-RS/CSI-IM Resource Set Activation/Deactivation
    MAC CE on a Serving Cell:
    2> indicate to lower layers the information regarding the SP CSI-RS/CSI-IM Resource Set
    Activation/Deactivation MAC CE.
5.18.3 Aperiodic CSI Trigger State subselection The network may select among tire configured aperiodic CSI trigger states of a Serving Cell by sending the Aperiodic CSI Trigger State Subselection MAC CE described in subclause 6.1.3.13.
The MAC entity shall:
  1> if the MAC entity receives an Aperiodic CSI trigger State Subselection MAC CE on a Serving
    Cell:
    2> indicate to lower layers the information regarding Aperiodic CSI trigger State Subselection
    MAC CE.

CSI Reporting Using PUSCH

An aperiodic CSI report carried on the PUSCH supports wideband and sub-band frequency granularities. An aperiodic CSI report carried on the PUSCH supports Type I and Type II CSI.

A SP CSI report on the PUSCH supports Type I and Type II CSI with wideband and sub-band frequency granularities. PUSCH resources and a modulation and coding scheme (MCS) for the SP CSI report are allocated semi-permanently by UL DCI.

The CSI report on the PUSCH may include Part 1 and Part 2. The part 1 is used to identify the number of information bits of Part 2. Part 1 is completely transmitted before the part 2.

For Type I CSI feedback, Part 1 contains RI (if reported), CRI (if reported), and CQI for the first codeword. Part 2 contains PMI and contains the CQI when RI>4.

For Type II CSI feedback, Part 1 has a fixed payload size and contains RI, CQI, and an indication (NIND) of the number of non-zero wideband amplitude coefficients for each layer of the Type II CSI. Part 2 contains the PMI of the Type II CSI. Part 1 and Part 2 are separately encoded.

When CSI reporting on PUSCH includes two parts and a CSI payload is less than a payload size provided by PUSCH resources allocated for the CSI reporting, the UE may omit a portion of the Part 2 CSI. The omission of Part 2 CSI is determined according to the priority order shown in Table 11, where Priority 0 is the highest priority and priority $2N_{Rep}$ is the lowest priority. N_Rep is the number of CSI reports in one slot.

TABLE 11

Priority 0:
Part 2 wideband CSI for CSI reports 1 to $N_{Rep}$
Priority 1;
Part 2 subband CSI of even subbands for CSI report 1
Priority 2:
Part 2 subband CSI of odd subbands for CSI report 1
Priority 3:
Part 2 subband CSI of even subbands for CSI report 2
Priority 4:
Part 2 subband CSI of odd subbands for CSI report 2
Priority $2N_{Rep} - 1$:
Part 2 subband CSI of even subbands for CSI report $N_{Rep}$
Priority $2N_{Rep}$:
Part 2 subband CSI of odd subbands for CSI report $N_{Rep}$ When Part 2 CSI information for a particular priority level is omitted, the UE omits all of the information at that priority level.

When the UE is scheduled to transmit a transport block on PUSCH multiplexed with a CSI report, Part 2 CSI is omitted only when an UCI code rate for transmitting all of Part 2 would be greater than a threshold code rate $$c_T = \frac{c_{MCS}}{\beta_{offset}^{CSI-2}},$$

where $c_{MCS}$ is the target PUSCH code rate, and $\beta_{offset}^{CSI-2}$ is the CSI offset value.

Part 2 CSI is omitted level by level, beginning with the lowest priority level until the lowest priority level is reached which causes the UCI code rate to be less than or equal to $c_T$.

When Part 2 CSI is transmitted on PUSCH with no transport block, lower priority bits are omitted until Part 2 CSI code rate is below a threshold code rate $$c_T = \frac{\beta_{offset}^{CSI-part1}}{\beta_{offset}^{CSI-part2}} \cdot r_{CSI-1}$$

lower than 1, where $\beta_{offset}^{CSI-part1}$ and $\beta_{offset}^{CSI-part2}$ are the CSI offset value, and is based on the code rate calculated at UE or signalled in DCI.

CSI Reporting Using PUCCH

A UE may be configured with multiple periodic CSI Reports corresponding to one or more higher layer configured CSI Reporting Settings, where the associated CSI measurement links and CSI resource settings are higher layer configured.

Periodic CSI reporting on PUCCH formats 2, 3, or 4 supports Type I CSI based on wideband.

For SP CSI on PUSCH, the UE performs SP CSI on PUSCH in a slot $n+3N_{slot}^{subframe,\mu}+1$ after HARQ-ACK corresponding to PDSCH carrying a selection command in a slot n is transmitted.

The selection command contains one or more report setting indications where the associated CSI resource settings are configured.

The SP CSI report supports the Type I CSI on PUCCH.

SP CSI reporting on the PUCCH format 2 supports Type I CSI with wideband frequency granularity. SP CSI reporting on PUCCH formats 3 or 4 supports Type I sub-band CSI and Type II CSI with wideband frequency granularity.

When the PUCCH carry Type I CSI with wideband frequency granularity, the CSI payload carried by the PUCCH format 2 and PUCCH formats 3 or 4 are identical and the same irrespective of RI (if reported), CRI (if reported).

For Type I CSI sub-band reporting on PUCCH formats 3 or 4, the payload is split into two parts.

The first part (Part 1) contains RI (if reported), CRI (if reported), and CQI for the first codeword. The second part (Part 2) contains PMI and contains the CQI for the second codeword when RI>4.

A SP CSI report carried on the PUCCH formats 3 or 4 supports Type II CSI feedback, but only Part 1 of Type II CSI feedback.

The CSI reporting on the PUCCH formats 3 or 4 supporting Type II CSI feedback may depend on a UE capability.

A Type II CSI report (Part 1 only) carried on PUCCH formats 3 or 4 shall be calculated independently of any Type II CSI report carried on the PUSCH.

When the UE is configured with CSI Reporting on PUCCH formats 2, 3 or 4, each PUCCH resource is configured for each candidate UL BWP.

When the UE receives an active SP CSI reporting configuration on PUCCH and does not receive a deactivation command, the CSI reporting is carried on if CSI reported BWP is an active BWP, otherwise the CSI reporting is temporarily stopped. This operation is also applied for SP CSI on PUCCH. For PUCCH based SP CSI reporting, the CSI reporting is automatically deactivated when a BWP switch occurs.

Depending on a length of PUCCH transmission, the PUCCH format may be classified into a short PUCCH or a long PUCCH. PUCCH format 0 and 2 may be referred to as the short PUCCH, and PUCCH format 1, 3 and 4 may be referred to as the long PUCCH.

For the PUCCH based CSI reporting, a short PUCCH based CSI reporting and a long PUCCH based CSI reporting are described in detail below.

The short PUCCH-based CSI reporting is used only for wideband CSI reporting. The short PUCCH-based CSI reporting has the same payload regardless of the RI/CRI of a given slot for avoiding blind decoding.

A size of an information payload may be different between maximum CSI-RS ports of the CSI-RS configured in a CSI-RS resource set.

When a payload including PMI and CQI is diversified to include RI/CQI, padding bits are added to RI/CRI/PMI/CQI before an encoding procedure for equalizing payloads related to other RI/CRI values. Further, RI/CRI/PMI/CQI may be encoded as padding bits, if necessary.

For the wideband reporting, the long PUCCH-based CSI reporting may use the same solution as the short PUCCH-based CSI reporting.

The long PUCCH-based CSI reporting uses the same payload regardless of RI/CRI. For the sub-band reporting, two-part encoding (for type I) is applied.

Part 1 may have a fixed payload according to the number of ports, CSI type, RI restrictions, etc., and Part 2 may have various payload sizes according to Part 1.

CSI/RI may be first encoded to determine a payload of PMI/CQI. Further, CQIi (i=1, 2) corresponds to a CQI for an i-th codeword (CW).

For the long PUCCH, Type II CSI report may carry only Part 1.

What has been described above (e.g., 3GPP system, CSI-related operations, etc.) can be applied in combination with the methods described in the present disclosure or can be added up to clarify the technical features of the methods described in the present disclosure. In the present disclosure, 'I' may mean that all the contents distinguished by 'I' are included (and), or only part of the distinguished contents is included (or).

The existing LTE codebook or NR Type I codebook is a method of selecting a specific DFT beam group using W1 (e.g., first PMI) and selecting a single precoding vector (e.g., digital precoding vector consisting of DFT vector) per layer for the selected specific DFT beam group using W2 (e.g., second PMI) and/or through co-phasing to construct a codebook. A Type II codebook is a codebook capable of enhancing a higher codebook resolution and improving a performance by selecting a plurality of precoding vectors using the W1 and linearly combining the selected plurality of precoding vectors using the W2. A Type II port selection codebook constructs a port selection codebook as the W1 matrix construction and follows the existing Type II codebook construction as it is as the W2 matrix construction, and may assume that each port (e.g., beamformed CSI-RS port) is replaced by a specific analog beam and/or digital beam.

Rel-16 Type II codebook (i.e., enhanced Type II codebook) is configured to reuse a structure of the W1 matrix in the existing Rel-15 Type II codebook and modify only the W2 matrix. That is, a final codebook may be constructed by compressing a PMI per all subbands (SBs) within a configured bandwidth (BW) not PMI calculation on a per subband (SB) basis. Specifically, a codebook may be constructed for the W1 consisting of L orthogonal DFT beams corresponding to wideband (WB) information through a method of combining beams by a subband-wide (e.g., combining beams based on an amplitude and/or a phase), i.e., a 'DFT-based compression' method.

Table 12 represents an example of the DFT-based compression method in terms of CSI reporting overhead reduction based on the Type II CSI codebook of ranks 1 and 2.

TABLE 12

| DFT-based compression |
|---|

Precoders for a layer is given by size-P × $N_3$ matrix $W = W_1 \tilde{W}_2 W_f^H$
  $P = 2N_1N_2$ = #SD dimensions
  $N_3$ = #FD dimensions
    FFS value and unit of $N_3$
  Precoder normalization: the precoding matrix for given rank and unit of $N_3$ is normalized to norm 1/sqrt(rank)
Spatial domain (SD) compression
  L spatial domain basis vectors (mapped to the two polarizations, so 2L in total) selected Compression in spatial domain using $W_1 = \begin{bmatrix} v_0 v_1 \cdots v_{L-1} & 0 \\ 0 & v_0 v_1 \cdots v_{L-1} \end{bmatrix}$, where $\{v_i\}_{i=0}^{L-1}$ are $N_1 N_2 \times 1$ orthogonal DFT vectors (same as Rel. 15 Type II)
Frequency-domain (FD) compression Compression via $W_f = [W_f(0), \ldots, W_f(2L-1)]$ where $W_f(i) = [f_{k_{i,0}} f_{k_{i,1}} \cdots f_{k_{i,M_i-1}}]$, where $\{f_{k_{i,m}}\}_{m=0}^{M_i-1}$ are $M_i$ size-$N_3 \times 1$ orthogonal DFT vectors for SD-component
  $i = 0, \ldots, 2L - 1$
    Number of FD-components $\{M_i\}$ or $\Sigma_{i=0}^{2L-1}$ is configurable, FFS value range
  FFS: choose one of the following alternatives
    Alt1. common basis vectors: $W_f = [f_{k_0} f_{k_1} \cdots f_{k_{M-1}}]$, i.e. $M_i = M \forall i$ and
    $\{k_{i,m}\}_{m=0}^{M_i-1}$ are identical (i.e., $k_{i,m} = k_m$, $i = 0, \ldots, 2L - 1$)
    Alt2. independent basis vectors: $W_f = [W_f(0), \ldots, W_f(2L - 1)]$, where $W_f(i) =$ $[f_{k_{i,0}} f_{k_{i,1}} \cdots f_{k_{i,M_i-1}}]$, i.e. $M_i$ frequency–domain components (per SD-component)

are selected
    Note: $\{k_m\}_{m=0}^{M-1}$ or $\{k_{i,m}\}_{m=0}^{M_i-1}$, $i = 0, \ldots, 2L - 1$ are all selected from the index set
    $\{0, 1, \ldots, N_3 - 1\}$ from the same orthogonal basis group
  FFS: If oversampled DFT basis or DCT basis is used instead of orthogonal DFT basis
  FFS: Same or different FD-basis selection across layers
Linear combination coefficients (for a layer)
  FFS if $\tilde{W}_2$ is composed of $K = 2LM$ or $K = \Sigma_{i=0}^{2L-1} M_i$ linear combination coefficients

TABLE 12-continued

DFT-based compression

FFS if only a subset $K_0 < K$ of coefficients are reported (coefficients not reported are zero).
FFS if layer compression is applied so that $\Sigma_{i=0}^{2L-1} M_i$ transformed coefficients are used to construct $\tilde{W}2$ for layer 1 (where the transformed coefficients are the reported quantity)
FFS quantization/encoding/reporting structure
Note: The terminology "SD-compression" and "FD-compression" are for discussion purposes only and are not intended to be captured in the specification A Rel-16 Type II port selection codebook may be similarly configured such that the W1 matrix uses the Rel-15 Type II port selection codebook and the W2 matrix uses a matrix of the Rel-16 Type II codebook.

The Rel-16 Type II codebook may be supported for the case of the higher rank such as rank 3 or 4. However, in this case, if the W1 of the Rel-15 Type II port selection codebook is used as it is, it may be unsuitable for the support of the higher rank such as rank 3 or 4 since a freedom of port selection is greatly reduced. Accordingly, the present disclosure proposes a method of constructing a Type II port selection codebook capable of applying to the higher rank value (e.g., rank 3, rank 4), in particular, a method of constructing the W1.

The present disclosure is described focusing on an example of a Type II port selection codebook constructed by a linear combination of two matrixes (e.g., W1 and W2) for convenience of explanation, but this does not limit the technical scope of the present disclosure. Accordingly, it is apparent that methods and/or embodiments described in the present disclosure can be applied to a codebook constructed by the linear combination based on three or more multi-matrixes.

Before describing the method proposed in the present disclosure, the Rel-15 Type II port selection codebook is described in detail. If the higher layer parameter 'codebook-Type' is configured to the UE as 'typeII-PortSelection', the type II port selection codebook may be used. Further, the following information may be configured to the UE.

The number of CSI-RS ports is given by $P_{CSI-RS} \in \{4,8,12,16,24,32\}$ as configured by higher layer 'nrofPorts'.

The value of L is configured with the higher layer parameter 'numberOfBeams', where L=2 when $P_{CSI-RS}=4$ and $L\in\{2,3,4\}$ when $P_{CSI-RS}\geq 4$.

The value of d is configured with the higher layer parameter 'portSelectionSamplingSize', where $d\in\{1,2,3,4\}$ and $d\leq \min$ $$\left(\frac{P_{CSI-RS}}{2}, L\right).$$

The value of $N_{PSK}$ is configured with the higher layer parameter 'phaseAlphabetSize', where $N_{PSK} \in \{4,8\}$.

The UE is configured with the higher layer parameter 'subbandAmplitude' set to 'true' or 'false'.

The UE shall not report RI>2.

The UE may be also configured with the higher layer parameter 'typeII-PortSelectionRI-Restriction'. The bitmap parameter 'typeII-PortSelectionRI-Restriction' forms the bit sequence $r_1,r_0$, where $r_0$ is the LSB and $r_1$ is the MSB. When $r_i$ is zero, $i\in\{0,1\}$, PMI and RI reporting are not allowed to correspond to any precoder associated with v=i+1 layers.

When $v\leq 2$, where v is the associated RI value, each PMI value corresponds to the codebook indices $i_1$ and $i_2$. The codebook indices $i_1$ and $i_2$ are the same as Equation 3.

$$i_1 = \begin{cases} [i_{1,1}\ i_{1,3,1}\ i_{1,4,1}] & v=1 \\ [i_{1,1}\ i_{1,3,1}\ i_{1,4,1}\ i_{1,3,2}\ i_{1,4,2}] & v=2 \end{cases} \quad \text{[Equation 3]}$$

$$i_2 = \begin{cases} [i_{2,1,1}] & subbandAmplitude = \text{'false'}, v=1 \\ [i_{2,1,1}\ i_{2,1,2}] & subbandAmplitude = \text{'false'}, v=2 \\ [i_{2,1,1}\ i_{2,2,1}] & subbandAmplitude = \text{'true'}, v=1 \\ [i_{2,1,1}\ i_{2,2,1}\ i_{2,1,2}\ i_{2,2,2}] & subbandAmplitude = \text{'true'}, v=2 \end{cases}$$

The L antenna ports per polarization are selected by the index $i_{1,1}$, where $$i_{1,1} \in \left\{0, 1, \ldots, \left\lceil \frac{P_{CSI-RS}}{2d} \right\rceil - 1\right\}.$$

Linear combination coefficients of the Rel-15 Type II port selection codebook may be determined based on the contents of Table 13.

TABLE 13

The strongest coefficient on layer l, l = 1, . . . , v is identified by $i_{1,3,l} \in \{0, 1, \ldots, 2L-1\}$.
The amplitude coefficient indicators $i_{1,4,l}$ and $i_{2,2,l}$ are $$i_{1,4,l} = \left[k_{l,0}^{(1)}, k_{l,1}^{(1)}, \ldots, k_{l,2L-1}^{(1)}\right]$$

$$i_{2,2,l} = \left[k_{l,0}^{(2)}, k_{l,1}^{(2)}, \ldots, k_{l,2L-1}^{(1)}\right]$$

$$k_{l,i}^{(1)} \in \{0, 1, \ldots, 7\}$$

$$k_{l,i}^{(2)} \in \{0, 1\} \qquad \text{for } l = 1, \ldots, v.$$

The mapping from $k_{l,i}^{(1)}$ to the amplitude coefficient $p_{l,i}^{(1)}$ is given in Table 5.2.2.2.3-2 and the mapping from $k_{l,i}^{(2)}$ to the amplitude coefficient $p_{l,i}^{(2)}$ given in Table 5.2.2.2.3-3. The amplitude coefficients are represented by TABLE 13-continued $$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(1)}] \text{ for } l = 1, \ldots, v.$$

The phase coefficient indicators are
$i_{2,1,l} = [c_{l,0}, c_{l,1}, \ldots, c_{l,2L-1}]$ for $l = 1, \ldots, v.$
The amplitude and phase coefficient indicators are reported as follows:
The indicators $k_{l,i_{1,3,l}}^{(1)} = 7$, $k_{l,i_{1,3,l}}^{(2)} = 1$, and $c_{l,i_{1,3,l}} = 0$ ($l = 1, \ldots, v$). $k_{l,i_{1,3,l}}^{(1)}$, $k_{l,i_{1,3,l}}^{(2)}$, and $c_{l,i_{1,3,l}}$ are not reported for $l = 1, \ldots, v.$
The remaining $2L - 1$ elements of $i_{1,4,l}$ ($l = 1, \ldots, v$) are reported, where $k_{l,i}^{(1)} \in \{0, 1, \ldots, 7\}$. Let $M_l$ ($l = 1, \ldots, v$) be the number of elements of $i_{1,4,l}$ that satisfy $k_{l,i}^{(1)} > 0$.
The remaining $2L - 1$ elements of $i_{2,1,l}$ and $i_{2,2,l}$ ($l = 1, \ldots, v$) are reported as follows:
 When subbandAmplitude is set to 'false',
  $k_{l,i}^{(2)} = 1$ for $l = 1, \ldots, v$, and $i = 0, 1, \ldots, 2L - 1$. $i_{2,2,l}$ is not reported for $l = 1, \ldots, v$.
  For $l = 1, \ldots, v$, the $M_l - 1$ elements of $i_{2,1,l}$ corresponding to the coefficients that satisfy $k_{l,i}^{(1)} > 0$, $i \neq i_{1,3,l}$, as determined by the reported elements of $i_{1,4,l}$, are reported, where $c_{l,i} \in \{0, 1, \ldots, N_{PSK} - 1\}$ and the remaining $2L - M_l$ elements of $i_{2,1,l}$ are not reported and are set to $c_{l,i} = 0$.
 When subbandAmplitude is set to 'true',
  For $l = 1, \ldots, v$, the elements of $i_{2,2,l}$ and $i_{2,1,l}$ corresponding to the min $(M_l, K^{(2)}) - 1$ strongest coefficients (excluding the strongest coefficient indicated by $i_{1,3,l}$), as determined by the corresponding reported elements of $i_{1,4,l}$, are reported, where $k_{l,i}^{(2)} \in \{0,1\}$ and $c_{l,i} \in \{0, 1, \ldots, N_{PSK} - 1\}$. The values of $K^{(2)}$ are given in Table 5.2.2.2.3-4. The remaining $2L - \min(M_l, K^{(2)})$ elements of $i_{2,2,l}$ are not reported and are set to $K_{l,i}^{(2)} = 1$. The elements of $i_{2,1,l}$ corresponding to the $M_l - \min(M_l, K^{(2)})$ weakest non-zero coefficients are reported, where $c_{l,i} \in \{0, 1, 2, 3\}$. The remaining $2L - M_l$ elements of $i_{2,1,l}$ are not reported and are set to $c_{l,i} = 0$.
 When two elements, $k_{l,x}^{(1)}$ and $k_{l,y}^{(1)}$, of the reported elements of $i_{1,4,l}$ are identical ($k_{l,x}^{(1)} = k_{l,y}^{(1)}$), then element min $(x, y)$ is prioritized to be included in the set of the min $(M_l, K^{(2)}) - 1$ strongest coefficients for $i_{2,1,l}$ and $i_{2,2,l}$ ($l = 1, \ldots, v$) reporting.

The type II port selection codebooks for 1-2 layers may be shown as in Table 14.

TABLE 14

| Layers | |
|---|---|
| $v = 1$ | $W_{i_{1,1}, p_1^{(1)}, p_1^{(2)}, i_{2,1,1}}^{(1)} = W_{i_{1,1}, p_1^{(1)}, p_1^{(2)}, i_{2,1,1}}^{1}$ |
| $v = 2$ | $W_{i_{1,1}, p_1^{(1)}, p_1^{(2)}, i_{2,1,1}, p_2^{(1)}, p_2^{(2)}, i_{2,1,2}}^{(2)} = \frac{1}{\sqrt{2}} \left[ W_{i_{1,1}, p_1^{(1)}, p_1^{(2)}, i_{2,1,1}}^{1} \quad W_{i_{1,1}, p_2^{(1)}, p_2^{(2)}, i_{2,1,2}}^{2} \right]$ | where $W_{i_{1,1}, p_1^{(1)}, p_1^{(2)}, i_{2,1,l}}^{l} = \frac{1}{\sqrt{\sum_{i=0}^{2L-1}(p_{l,i}^{(1)} p_{l,i}^{(2)})^2}} \begin{bmatrix} \sum_{i=0}^{L-1} v_{i_{1,1}d+i} p_{l,i}^{(1)} p_{l,i}^{(2)} \varphi_{l,i} \\ \sum_{i=0}^{L-1} v_{i_{1,1}d+i} p_{l,i+L}^{(1)} p_{l,i+L}^{(2)} \varphi_{l,i+L} \end{bmatrix}, l = 1, 2$ and the mappings from $i_1$ to $i_{1,1}$, $p_1^{(2)}$, $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$.

In Table 14, quantity $\varphi_{l,j}$ is given in Equation 4.

$$\varphi_{l,i} = \begin{cases} e^{j2\pi c_{l,i}/N_{PSK}} & \text{subbandAmplitude = 'false'} \\ e^{j2\pi c_{l,i}/N_{PSK}} & \text{subbandAmplitude = 'true', } \min(M_l, K^{(2)}) \text{ strongest coefficients (including } i_{3,l}\text{) with } k_{l,i}^{(1)} > 0 \\ e^{j2\pi c_{l,i}/4} & \text{subbandAmplitude = 'true', } M_l - \min(M_l, K^{(2)}) \text{ weakest coefficients with } k_{l,i}^{(1)} > 0 \\ 1 & \text{subbandAmplitude = 'true', } 2L - M_l \text{ coefficients with } k_{l,i}^{(1)} = 0 \end{cases}$$ [Equation 4]

$v_m$ is a $\frac{P_{CSI-RS}}{2}$ element column vector containing a value of 1 in element $\left(m \bmod \frac{P_{CSI-RS}}{2}\right)$ and zeros elsewhere (where the first element is element 0)

W1 construction of the Rel-15 port selection codebook may be shown as in Equation 5. .

[Equation 5]

$$W_1 = \begin{bmatrix} E_{\frac{X}{2} \times L} & 0 \\ 0 & E_{\frac{X}{2} \times L} \end{bmatrix},$$

$$E_{\frac{X}{2} \times L} = \begin{bmatrix} e^{(\frac{X}{2})}_{mod(md,\frac{X}{2})} & e^{(\frac{X}{2})}_{mod(md+1,\frac{X}{2})} & \cdots & e^{(\frac{X}{2})}_{mod(md+L-1,\frac{X}{2})} \end{bmatrix}$$

In Equation 5, X is the number of CSI-RS ports and may correspond to $P_{CSI-RS}$. X may have a value of $X \in \{4,8,12,16,24,32\}$. The value of L is $L \in \{2,3,4\}$ and is configurable. The value of d is configurable and is $d \in \{1,2,3,4\}$ under the condition that $$d \leq \frac{X}{2}$$

and $d \leq L$. Further, $$e_i^{(\frac{X}{2})}$$

is a length $$\frac{X}{2}$$

vector with i-th element equal to 1 and 0 elsewhere. This may correspond to $v_m$ in the above Table 14.

In Equation 5, $$m \in \left\{0, 1, \ldots, \left\lceil \frac{X}{2d} \right\rceil - 1\right\}$$

is port selection and may correspond to index $i_{1,1}$ in the above-described Type II port selection codebook. The calculation and reporting of m are performed in wideband and may be reported using $$\left\lceil \log_2\left(\frac{X}{2d}\right) \right\rceil \text{ bits.}$$

A method of constructing a Type II port selection codebook proposed in the present disclosure is described in detail below. Proposed methods and/or embodiments to be described below propose a method of constructing W1 of a Type II port selection codebook suitable for even the support of a higher rank value (e.g., rank 3, rank 4).

Methods and/or embodiments described in the present disclosure (e.g., embodiments 1/2/3/4/5, etc.) are merely distinguished for convenience of explanation and do not limit the scope of the present disclosure. Accordingly, two or more embodiments can be combined, or partial configuration of one embodiment can be replaced by or combined with partial configuration of another embodiment.

Embodiment 1

Embodiment 1 describes a method of constructing a port selection codebook for a case in which a UE is configured with 8-port CSI-RS and L=4 and reporting information indicating selected ports.

Based on the above-described Rel-15 Type II port selection codebook and Equation 5, port selection combinations of 8-port CSI-RS may be configured. For 8 CSI-RS ports, the value of L (e.g., numberofBeams) and the value of d (e.g., portselectionsamplingsize) may be set via higher layer signaling.

Table 15 shows an example of port selection combination for 8 CSI-RS ports. For example, the value of d may be {1, 2} when L=2, and the value of d may be {1,2,3,4} when L=4.

TABLE 15

| | d | m | Selected Port (L port) | | | |
|---|---|---|---|---|---|---|
| L = 2 | 1 | 0 | 0 | 1 | | |
| | | 1 | 1 | 2 | | |
| | | 2 | 2 | 3 | | |
| | | 3 | 3 | 0 | | |
| | 2 | 0 | 0 | 1 | | |
| | | 1 | 2 | 3 | | |
| L = 4 | 1 | 0 | 0 | 1 | 2 | 3 |
| | | 1 | 1 | 2 | 3 | 0 |
| | | 2 | 2 | 3 | 0 | 1 |
| | | 3 | 3 | 0 | 1 | 2 |
| | 2 | 0 | 0 | 1 | 2 | 3 |
| | | 1 | 2 | 3 | 0 | 1 |
| | 3 | 0 | 0 | 1 | 2 | 3 |
| | | 1 | 3 | 0 | 1 | 2 |
| | 4 | 0 | 0 | 1 | 2 | 3 |

Referring to Table 15, when L=4, all the selected ports may be configured in the same combination irrespective of the values of L and d set via higher layer signaling. That is, when L=4, there is a difference only in the order of port selection, and the ports may be selected according to combinations of {0,1,2,3} In this case, the UE proposes the following operation since the value of m reported by WB PMI is redundant.

In a port selection codebook, when 8-port CSI-RS and L=4 are configured, the UE may omit (i.e., 0-bit) the reporting of CSI corresponding to the value of m (i.e., codebook index corresponding to m) irrespective of the value of d set. In this instance, the port selection order is configured in "0, 1, 2, 3" (i.e., ascending order), and may be pre-defined/pre-configured between the UE and the base station. In this case, the W1 construction of the port selection codebook may be constructed as a unit matrix of 8-by-8 size and may be given in Equation 6.

$$W_1 = \begin{bmatrix} E_{4 \times 4} & 0 \\ 0 & E_{4 \times 4} \end{bmatrix}, E_{4 \times 4} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}. \quad \text{[Equation 6]}$$

The embodiment 1 has described the predefined example where the port selection order is configured in "0, 1, 2, 3", but this is merely an example and can be configured in other port selection orders. For example, the port selection order may be pre-defined/pre-configured between the UE and the base station to follow any specific row when L=4 and d=1 in the above Table 15. As another example, the port selection order may be predefined to be configured in "3, 2, 1, 0" (i.e., descending order).

When 8-port CSI-RS and L=4 are configured in the port selection codebook through the Embodiment 1 described in the present disclosure, there is an effect in that a signaling overhead can be reduced by omitting the reporting related to the port selection.

Embodiment 2

For example, based on the above-described Rel-15 Type II port selection codebook and Equation 5, port selection combinations of 16-port CSI-RS may be configured. For 16 CSI-RS ports, the value of L (e.g., numberofBeams) and the value of d (e.g., portselectionsamplingsize) may be set via higher layer signaling.

Table 16 shows an example of port selection combination for 16 CSI-RS ports. For example, the value of d may be {1, 2} when L=2, and the value of d may be {1,2,3,4} when L=4.

TABLE 16

|  | d | m | Selected Port (L port) | | | |
|---|---|---|---|---|---|---|
| L = 2 | 1 | 0 | 0 | 1 | | |
|  |  | 1 | 1 | 2 | | |
|  |  | 2 | 2 | 3 | | |
|  |  | 3 | 3 | 4 | | |
|  |  | 4 | 4 | 5 | | |
|  |  | 5 | 5 | 6 | | |
|  |  | 6 | 6 | 7 | | |
|  |  | 7 | 7 | 0 | | |
|  | 2 | 0 | 0 | 1 | | |
|  |  | 1 | 2 | 3 | | |
|  |  | 2 | 4 | 5 | | |
|  |  | 3 | 6 | 7 | | |
| L = 4 | 1 | 0 | 0 | 1 | 2 | 3 |
|  |  | 1 | 1 | 2 | 3 | 4 |
|  |  | 2 | 2 | 3 | 4 | 5 |
|  |  | 3 | 3 | 4 | 5 | 6 |
|  |  | 4 | 4 | 5 | 6 | 7 |
|  |  | 5 | 5 | 6 | 7 | 0 |
|  |  | 6 | 6 | 7 | 0 | 1 |
|  |  | 7 | 7 | 0 | 2 | 3 |
|  | 2 | 0 | 0 | 1 | 2 | 3 |
|  |  | 1 | 2 | 3 | 4 | 5 |
|  |  | 2 | 4 | 5 | 6 | 7 |
|  |  | 3 | 6 | 7 | 0 | 1 |
|  | 3 | 0 | 0 | 1 | 2 | 3 |
|  |  | 1 | 3 | 4 | 5 | 6 |
|  |  | 2 | 6 | 7 | 0 | 1 |
|  | 4 | 0 | 0 | 1 | 2 | 3 |
|  |  | 1 | 4 | 5 | 6 | 7 |

Referring to the port combination of Table 16, L ports/beams from a port selection starting point may be consecutively selected. In Table 16, a freedom of port selection may be reduced. However, if (analog and/or digital) beams mapped to each port are configured by implementation of the base station, a performance loss can be reduced even if the above Table 16 is used.

However, as described above, since the Rel-16 Type II codebook supports up to the ranks 3-4, if the above Table 16 is used as it is, a freedom of each port configuration may be greatly reduced (i.e., it may be difficult to ensure (semi) orthogonality between respective layers), and it may be difficult to support the higher rank (e.g., rank 3-4) or performance degradation may occur.

To solve the above problem, if the UE reports rank 3-4, i.e., RI=3 or RI=4 to the base station, an operation of reporting the value of m layer-specifically or layer-group specific may be considered. CSI related to the m is WB CSI attribute and may be included in Part 2 CSI.

In other words, to increase the selection freedom of linear combined ports, the UE may report the value of m (i.e., information indicating selection of L antenna ports) per layer or layer-group specifically. For example, the layer-group may include one or more layers. For example, layer [0,1] may form one layer-group, and layer [2,3] may form another layer-group. The value of m may be determined using the value of the Rel-15 port selection codebook, or determined by a value or an equation of a separately made table.

According to the current NR standard, the UE may report, to the base station, 'm' as $$\left\lceil \log_2 \left\lceil \frac{X}{2d} \right\rceil \right\rceil \text{ bit}$$

field size in wideband. In this case, the port selection m, where m∈

$$\left\{ 0, 1, \ldots, \left\lceil \frac{X}{2d} \right\rceil - 1 \right\},$$

may be reported layer-commonly as only one value. On the other hand, as in the embodiment 2, when m is reported per layer or layer-group specifically, bit-width of m may be determined as follows.

For example, if the UE reports the value of m layer-specifically, the value of m may be reported as $$RI * \left\lceil \log_2 \left\lceil \frac{X}{2d} \right\rceil \right\rceil \text{ bits.}$$

That is, the bit-width of m may increase in proportion to the number of layers (or RI value). For example, if the UE reports the value of m layer-group specifically, the value of m may be reported as $$Y * \left\lceil \log_2 \left\lceil \frac{X}{2d} \right\rceil \right\rceil \text{ bits,}$$

where Y is the number of layer-groups. That is, the bit-width of m may increase in proportion to the number of layer-groups.

Embodiment 3

To increase a freedom of port selection in a port selection codebook, a W1 matrix may be constructed as in Equation 7.

$$W_1 = \begin{bmatrix} E_{\frac{X}{2} \times L} & 0 \\ 0 & E'_{\frac{X}{2} \times L} \end{bmatrix}$$ [Equation 7]

$$E_{\frac{X}{2} \times L} = \left[ e_{mod\left(md, \frac{X}{2}\right)}^{\left(\frac{X}{2}\right)} e_{mod\left(md+1, \frac{X}{2}\right)}^{\left(\frac{X}{2}\right)} \cdots e_{mod\left(md+L-1, \frac{X}{2}\right)}^{\left(\frac{X}{2}\right)} \right]$$

$$E'_{\frac{X}{2} \times L} = \left[ e_{mod\left(m'd, \frac{X}{2}\right)}^{\left(\frac{X}{2}\right)} e_{mod\left(m'd+1, \frac{X}{2}\right)}^{\left(\frac{X}{2}\right)} \cdots e_{mod\left(m'd+L-1, \frac{X}{2}\right)}^{\left(\frac{X}{2}\right)} \right]$$

In Equation 7, X is the number of CSI-RS ports and may correspond to $P_{CSI-RS}$. X may have a value of X∈{4,8,12, 16,24,32}. The value of L is configurable (e.g., L∈{2,4}). The value of d is configurable and is d∈{1,2,3,4} under the condition that $$d \le \frac{X}{2}$$

and d≤L. Further, $$e_i^{\left(\frac{X}{2}\right)}$$

is a length $$\frac{X}{2}$$

vector with i-th element equal to 1 and 0 elsewhere.

In Equation 7, m, $$m' \in \left\{0, 1, \ldots, \left\lceil \frac{X}{2d} \right\rceil - 1\right\}$$

is port selection, and the calculation and reporting of m and m' are performed in wideband and may be reported using $$\left\lceil \log_2\left(\frac{X}{2d}\right) \right\rceil \text{bits.}$$

The Rel-15 Type II port selection codebook has common polarization characteristics. On the other hand, the UE may perform a different port selection per polarization of port based on the Embodiment 3 described in the present disclosure. In particular, the Type II port selection codebook operating based on beam-formed CSI-RS may not need to necessarily have the same basis matrix per polarization together with other Type I/II codebooks. This is because CSI-RS port mapping may be different depending on implementation of the base station (e.g., port virtualization).

Through the port selection codebook constructed based on the W1 matrix of the Embodiment 3, the UE may differently select the ports per polarization of antenna ports and report it to the base station.

The Equation 7 of the Embodiment 3 may be applied for all the ranks in the Type II port selection codebook or may be applied for a specific rank (e.g., when RI is 3 or more (e.g., RI=3 or 4)).

Embodiment 4

Embodiment 4 describes another method of constructing a W1 matrix of a Type II Port selection codebook. To increase a freedom of port selection in a port selection codebook, a W1 matrix may be constructed as in Equation 8.

$$W_1 = \begin{bmatrix} E_{\frac{X}{2} \times L} & 0 \\ 0 & E_{\frac{X}{2} \times L} \end{bmatrix}$$ [Equation 8]

-continued $$E_{\frac{X}{2} \times L} = \left[ e_{mod\left(md, \frac{X}{2}\right)}^{\left(\frac{X}{2}\right)} e_{mod\left(md+n, \frac{X}{2}\right)}^{\left(\frac{X}{2}\right)} \cdots e_{mod\left(md+n(L-1), \frac{X}{2}\right)}^{\left(\frac{X}{2}\right)} \right]$$

In Equation 8, X is the number of CSI-RS ports and may correspond to $P_{CSI-RS}$. Possible values of X follow a Type II single panel (SP) codebook and may have, for example, the value of X∈{4,8,12,16,24,32}. The value of L is configurable (e.g., L∈{2,4}). The value of d is configurable and is d∈{1,2,3,4} under the condition that $$d \le \frac{X}{2}$$

and d≤L. Further, $$e_i^{\left(\frac{X}{2}\right)}$$

is a length $$\frac{X}{2}$$

vector with i-th element equal to 1 and 0 elsewhere.

In Equation 8, $$m \in \left\{0, 1, \ldots, \left\lceil \frac{X}{2d} \right\rceil - 1\right\}$$

is port selection, and the calculation and reporting of m are performed in wideband and may be reported using $$\left\lceil \log_2\left(\frac{X}{2d}\right) \right\rceil \text{bits.}$$

Further, n is n∈{1, . . . , N}, and N value of a set of {n} may be configured via higher layer signaling or may be a fixed value (e.g., N=2). The reporting of n may be performed in wideband using ⌊log₂S⌉ bits, where S is the size of set n.

The Embodiment 4 described in the present disclosure is a method of introducing a new parameter of 'n' and constructing a combination of port selection while having a specific step size as well as consecutive port selection. That is, ports can be selected per n-step size by introducing the parameter 'n' denoting a step size of port selection in addition to a method of selecting consecutive ports.

Table 17 shows an example of combination of port selection for 16 CSI-RS ports when L=4, d=2 and n={1, 3}. Table 17 is merely an example for convenience of explanation and does not limit the technical scope of the present disclosure.

Referring to Table 17, when L=4, d=2 and n=3, ports may be selected at intervals of 3-step size, for example, "4, 7, 2, 5".

TABLE 17

| d | n | m | Selected Port (L port) | | | |
|---|---|---|---|---|---|---|
| L = 4 | 2 | 1 | 0 | 0 | 1 | 2 | 3 |
| | | | 1 | 2 | 3 | 4 | 5 |
| | | | 2 | 4 | 5 | 6 | 7 |
| | | | 3 | 6 | 7 | 0 | 1 |
| | 2 | 3 | 0 | 0 | 3 | 6 | 1 |
| | | | 1 | 2 | 5 | 0 | 3 |
| | | | 2 | 4 | 7 | 2 | 5 |
| | | | 3 | 6 | 1 | 4 | 7 |

In the Embodiment 4, the values of n and m may be jointly reported as one value, and other parameter may be fixed (rank-specifically) (e.g., fixed to d=2).

Further, the method described in the Embodiment 4 may be configured to be combined with the Embodiment 3. For example, the UE may perform a different port selection per polarization, and in this instance, may introduce the parameter n denoting the step size for port selection and select the port at a specific step size as well as consecutive port selection.

The W1 matrix constructed by the combination of the Embodiment 4 and the Embodiment 3 may be shown as in Equation 9. The ports may be selected at n-step size per polarization of antenna ports, and the port selection for each polarization may be different.

[Equation 9]

$$W_1 = \begin{bmatrix} E_{\frac{X}{2} \times L} & 0 \\ 0 & E'_{\frac{X}{2} \times L} \end{bmatrix}$$

$$E_{\frac{X}{2} \times L} = \left[ e_{mod\left(md, \frac{X}{2}\right)}^{\left(\frac{X}{2}\right)} e_{mod\left(md+n, \frac{X}{2}\right)}^{\left(\frac{X}{2}\right)} \cdots e_{mod\left(md+n(L-1), \frac{X}{2}\right)}^{\left(\frac{X}{2}\right)} \right]$$

$$E'_{\frac{X}{2} \times L} = \left[ e_{mod\left(m'd, \frac{X}{2}\right)}^{\left(\frac{X}{2}\right)} e_{mod\left(m'd+n, \frac{X}{2}\right)}^{\left(\frac{X}{2}\right)} \cdots e_{mod\left(m'd+n(L-1), \frac{X}{2}\right)}^{\left(\frac{X}{2}\right)} \right]$$

In Equation 9, the step size per polarization is 'n' and has been described based on the same example, but the value of the step size per polarization may be set differently.

Embodiment 5

A Type II port selection codebook may be configured such that a W1 matrix uses a Rel-15 Type II port selection codebook and a W2 matrix uses a matrix of a Rel-16 Type II codebook. The value of L may be set through a higher layer parameter (e.g., numberOfBeams). The value of L may be the number of ports (i.e., the number of beams used for linear combination) selected based on the port selection codebook.

To increase a freedom of port selection for the higher rank (e.g., ranks 3 to 4), even if the base station has configured a specific value (e.g., L=2) to the UE via higher layer signaling (e.g., RRC), the UE may calculate CSI using a different L value from the set L value upon the calculation of CSI corresponding to a specific rank. The value of L used for the CSI calculation corresponding to the specific rank may be previously promised, or may be configured to the UE by the base station, or may be calculated and reported by the UE. When the UE reports the value of L, Part 2 CSI may vary. Therefore, the value of L may be included in Part 1 CSI.

For example, when the UE reports rank 3 or rank 4, even if the base station has configured the UE with L=2, the UE may assume L=4 upon CSI calculation for rank 3 or rank 4 and calculate the CSI. When L=2 and L=4, if there is no change in the payload of CSI corresponding to m and/or n, CSI related to the value of L may be included in Part 2 CSI. On the other hand, if there is a change in the payload of CSI, CSI related to the value of L may be included in Part 1 CSI.

The proposed methods and/or embodiments (e.g., Embodiments 1 to 5) described above can construct a port selection codebook capable of improving the port selection freedom for the higher rank.

FIG. 10 illustrates an example of signalling between a user equipment (UE) and a base station (BS) for the proposed methods and/or embodiments (e.g., the Embodiments 1 to 5) described above. FIG. 10 is merely an example for convenience of explanation and does not limit the technical scope of the present disclosure. Some of steps illustrated in FIG. 10 may be combined or omitted. Further, the above-described CSI related operation may be considered/applied when performing procedures to be described below.

A UE may receive configuration information from a base station (BS) via higher layer signaling (e.g., RRC or MAC CE), in S1005. That is, the base station may transmit the configuration information to the UE, in S1005. The configuration information may include system information (SI), scheduling information and/or CSI related configuration (e.g., see the above-described CSI reporting setting/CSI-RS resource setting, etc.), and the like. For example, the CSI related configuration may include CSI related information (e.g., codebook related configuration/maxRank/CSI-ReportConfig/CSI-resourceConfig, etc.) that the base station transmits to the UE based on the above-described proposed methods (e.g., the Embodiments 1/2/3/4/5, etc.).

The UE may receive a reference signal (e.g., SSB/CSI-RS/TRS/PT-RS) from the base station to receive channel state reporting, in S1010. That is, the base station may transmit the reference signal to the UE, in S1010.

The UE may receive an indication for CSI reporting from the base station, in S1015. That is, the base station may transmit the indication for CSI reporting to the UE, in S1015. For example, for aperiodic CSI reporting, DCI triggering the CSI reporting may correspond to the indication for CSI reporting. For example, for semi-persistent CSI reporting, activation information activating the CSI reporting may be received via MAC-CE, and in this case, the activation information may correspond to the indication for CSI reporting. Alternatively, for the semi-persistent CSI reporting/periodic CSI reporting, the step S1015 may be omitted. Further, the step S1010 and the step S1015 may be reversed or merged into one step.

The UE may measure the CSI based on the reference signal and the configured information from the base station (e.g., CSI related configuration/CSI reporting setting information/information indicated by DCI, etc.), in S1017. For example, the UE may apply the above-described proposed methods (e.g., the Embodiments 1/2/3/4/5, etc.) to calculate the CSI, and information (e.g. CQI, PMI, RI, LI, etc.) included in the CSI reported to the base station may be configured/determined based on the above-described proposed methods (e.g., the Embodiments 1/2/3/4/5, etc.).

The UE may transmit, to the base station, channel state information (CSI) (e.g., CRI/RI/CQI/PMI/LI), in S1020. That is, the base station may receive the CSI reporting from the UE. For example, CSI determined/calculated based on the above-described proposed methods (e.g., the Embodiments 1/2/3/4/5, etc.) may be reported.

The base station may determine/calculate data scheduling and/or precoding based on the CSI reported from the UE (and/or a situation of considering the CSI reported from the UE and other UEs served by the base station), in S1023.

The UE may receive, from the base station, data/a reference signal (for data decoding) depending on data scheduling information, in S1025. That is, the base station may transmit, to the (scheduled) UE, data applying the precoding and the reference signal for data decoding (e.g., DMRS, TRS, PT-RS), in S1025. In this case, the data scheduling and the precoding to be applied to data may be determined/calculated by the base station based on the CSI, etc. reported by the UE, but only the CSI reported by the UE may not be considered. Further, the step S1025 may be omitted, if necessary.

FIG. 11 illustrates an example of a flow chart of a CSI reporting operation of a UE to which methods and embodiments (e.g., the Embodiments 1 to 5) described in the present disclosure are applicable. FIG. 11 is merely an example for convenience of explanation and does not limit the scope of the present disclosure. Some step(s) illustrated in FIG. 11 may be omitted depending on situations and/or setting, etc.

For example, the UE may include one or more transceivers, one or more processors, and one or more memories that store instructions for operations executed by the one or more processors and are connected to the one or more processors.

The UE may receive configuration information from a base station (BS), in S1110. The configuration information may include information related to the above-described proposed methods and/or embodiments (e.g., the Embodiments 1/2/3/4/5, etc.). The configuration information may include information about a codebook. The configuration information may further include configuration information related to CSI. The configuration information may be received via higher layer signaling (e.g., RRC).

For example, the information about the codebook (e.g., CodebookConfig) may be used to configure the codebook (e.g., Type I codebook/Type II codebook). For example, the information about the codebook may include a codebook type, codebook subset restriction, the number of beams used for linear combination (e.g., numberOfBeams), size information of a port selection codebook (e.g., portSelectionSamplingSize), RI restriction information, and the like.

For example, the configuration information related to the CSI may include CSI resource configuration, CSI measurement configuration, CSI-RS resource configuration, CSI reporting configuration, and the like. For example, the configuration information related to the CSI may include configuration information related to CSI reporting (e.g., CSI-ReportConfig). That is, the UE may receive the configuration information related to CSI reporting. The configuration information related to one or more CSI reportings (e.g., CSI-ReportConfig) may be configured to the UE. The configuration information related to CSI reporting (e.g., CSI-ReportConfig) may include information related to a time domain behavior of the CSI reporting (e.g., reportConfigType). Based on the information related to the time domain behavior (e.g., reportConfigType), a CSI reporting behavior of a time domain may be configured by one of (i) periodic, (ii) semi-persistent, or (iii) aperiodic.

For example, the configuration information related to CSI reporting (e.g., CSI-ReportConfig) may include a reportQuantity parameter representing CSI related quantity for reporting. Reporting contents such as CRI, PMI, CQI, L1-RSRP, etc. may be configured through the reportQuantity parameter. The configuration information related to CSI reporting (e.g., CSI-ReportConfig) may include a periodicity and slot offset information of the CSI reporting.

For example, an operation of the UE (100/200 of FIGS. 13 to 17) in the step S1110 to receive the configuration information may be implemented by a device of FIGS. 13 to 17 to be described below. For example, referring to FIG. 14, one or more processors 102 may control one or more transceivers 106 and/or one or more memories 104 so as to receive the configuration information, and the one or more transceivers 106 may receive the configuration information.

The UE may receive a reference signal, in S1120. The reference signal may be a reference signal for CSI measurement. For example, the reference signal may be a CSI-RS. The reference signal may be received periodically, semi-persistently, or aperiodically.

For example, an operation of the UE (100/200 of FIGS. 13 to 17) in the step S1120 to receive the reference signal may be implemented by the device of FIGS. 13 to 17 to be described below. For example, referring to FIG. 14, one or more processors 102 may control one or more transceivers 106 and/or one or more memories 104 so as to receive the reference signal, and the one or more transceivers 106 may receive the reference signal.

The UE may measure the CSI based on the reference signal, in S1130. The UE may measure a channel based on the reference signal to calculate the CSI. The UE may perform the CSI measurement based on CSI-IM/NZP CSI-RS resource(s) for CSI-RS resource(s) and interference measurement for the channel measurement.

The CSI may be calculated based on the above-described proposed methods and/or embodiments (e.g., the Embodiments 1/2/3/4/5, etc.). For example, the CSI may be calculated using a codebook corresponding to a codebook type configured via information for a codebook included in the configuration information. For example, the codebook type may be configured as a port selection codebook based on the information for the codebook, and the UE may calculate the CSI based on the port selection codebook. The CSI may be calculated based on a codebook constructed based on multiple matrices (e.g., a first matrix and a second matrix). For example, the codebook (e.g., the port selection codebook) may be constructed by a linear combination of the multiple matrices (e.g., the first matrix and the second matrix).

For example, the first matrix (e.g., Equation 7) of the codebook may include a plurality of column vectors differently set for each polarization of antenna ports. Each row vector constructing the first matrix may include a specific element with a value of 1 and other elements with a value of 0. For example, the codebook constructed based on the first matrix may be used only for higher ranks in which a value of RI is 3 or more. For example, in Equation 7, (i) X is the number of antenna ports, (ii) L is the number of selected antenna ports, (iii) d is a value set from the base station, and (iv) m and m' are parameters related to a selection of the antenna ports. As an example, at least one of the parameters L, m or d may be indicated per layer or per layer-group.

As another example, the first matrix (e.g., Equation 8) may include a plurality of column vectors including specific elements with a value of 1 and other elements with a value of 0. Ports may be selected with a specific step size based on elements of each column vector.

As another example, the first matrix (e.g., Equation 9) may include a plurality of column vectors differently set for each polarization of antenna ports. Each row vector constructing the first matrix may include a specific element with a value of 1 and other elements with a value of 0. Ports may be selected with a specific step size based on elements of each column vector. Accordingly, based on a codebook constructed based on the first matrix (e.g., Equation 9), the ports may differently selected for each polarization of antenna ports depending on the specific step size.

For example, when the ports are selected with the specific step size, the UE may receive, from the base station, information about the specific step size. Alternatively, the specific step size may be determined by the UE. In this case, the UE may transmit the information about the specific step size to the base station by including the information about the specific step size in the CSI reporting.

For example, the UE may calculate the CSI using a specific value of L for the CSI reporting for a higher rank (e.g., ranks 3 to 4) regardless of a value of L (the number of selected ports) set via the information about the codebook. The specific value of L may be pre-defined, or the base station may configure the specific value of L to the UE, or the UE may report, to the base station, the specific value of L used for the CSI calculation. When the UE may reports the specific value of L to the base station, the UE may report it via Part 1 CSI.

For example, an operation of the UE (100/200 of FIGS. 13 to 17) in the step S1130 to perform the CSI measurement may be implemented by the device of FIGS. 13 to 17 to be described below. For example, referring to FIG. 14, one or more processors 102 may control one or more transceivers 106 and/or one or more memories 104 so as to perform the CSI measurement.

The UE may report the CSI to the base station, in S1140. That is, the UE may transmit the CSI to the base station. For example, the CSI may be reported periodically, semi-persistently, or aperiodically. The CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), or L1-RSRP.

For example, the PMI may correspond to codebook indexes. The codebook indexes may include an index indicating the selected antenna ports, an index indicating linear combination coefficients (e.g., phase coefficient, size coefficient), and the like.

For example, when the CSI based on the port selection codebook is reported, the CSI may include a codebook index (e.g., value of m) indicating the selected ports. In other words, the PMI included in the CSI may include information corresponding to a codebook index indicating the selected ports (i.e., antenna ports). For example, when each port selection is performed for each polarization of the antenna ports, at least one of the indexes corresponding to the PMI may be an index indicating the antenna port selected for each polarization. For example, the codebook index indicating the selected ports may be expressed by $$\left\lceil \log_2 \left\lceil \frac{X}{2d} \right\rceil \right\rceil \text{bit}$$

size, where X is the number of antenna ports (CSI-RS ports), and d is a size of the port selection codebook and may be set from the base station.

For example, the codebook index (e.g., value of m) indicating the selected ports may be reported layer-commonly as one value, or reported per layer or per layer-group. In other words, the CSI may include selection information for the antenna ports selected per layer or per layer-group, and the selection information may correspond to the codebook index (e.g., value of m) indicating the selected ports. When the codebook index indicating the selected ports is reported per layer or per layer-group, a bit size (number of bits) for reporting the codebook index (i.e., selection information) indicating the selected ports may increase in proportion to the number of layers or the number of layer-groups.

For example, when 8-port CSI-RS and the number of selected ports equal to 4 (e.g., L=4) are configured, the UE may not report the codebook index indicating the selected ports. In this instance, order of the selected ports may be configured in ascending order or descending order and may be pre-defined.

For example, an operation of the UE (100/200 of FIGS. 13 to 17) in the step S1140 to report the CSI may be implemented by the device of FIGS. 13 to 17 to be described below. For example, referring to FIG. 14, one or more processors 102 may control one or more transceivers 106 and/or one or more memories 104 so as to report the CSI, and the one or more transceivers 106 may transmit the CSI reporting.

FIG. 12 illustrates an example of a flow chart of a CSI reception operation of a base station (BS) to which methods and embodiments (e.g., the Embodiments 1 to 5) described in the present disclosure are applicable. FIG. 12 is merely an example for convenience of explanation and does not limit the scope of the present disclosure. Some step(s) illustrated in FIG. 12 may be omitted depending on situations and/or setting, etc.

The base station may mean a generic term for an object performing transmission and reception of data together with the UE. For example, the base station may be a concept including one or more transmission points (TPs), one or more transmission and reception points (TRPs), etc. The TP and/or the TRP may include a panel, a transmission and reception unit, etc. of the base station. The TRP may be divided according to information (e.g., index, ID) for a CORESET group (or CORESET pool). For example, if one UE is configured to perform transmission and reception with multiple TRPs (or cells), this may mean that multiple CORESET groups (or CORESET pools) are configured to the one UE. The above-described configuration for the CORESET groups (or CORESET pools) may be performed via higher layer signaling (e.g., RRC signaling, etc.).

For example, the base station may include one or more transceivers, one or more processors, and one or more memories that store instructions for operations executed by the one or more processors and are connected to the one or more processors.

The base station may transmit configuration information to a UE, in S1210. The configuration information may include information related to the above-described proposed methods and/or embodiments (e.g., the Embodiments 1/2/3/4/5, etc.). The configuration information may include information about a codebook. The configuration information may further include configuration information related to CSI. The configuration information may be transmitted via higher layer signaling (e.g., RRC).

For example, the information about the codebook (e.g., CodebookConfig) may be used to configure the codebook (e.g., Type I codebook/Type II codebook). For example, the information about the codebook may include a codebook type, codebook subset restriction, the number of beams used for linear combination (e.g., numberOfBeams), size information of a port selection codebook (e.g., portSelection-SamplingSize), RI restriction information, and the like.

For example, the configuration information related to the CSI may include CSI resource configuration, CSI measurement configuration, CSI-RS resource configuration, CSI reporting configuration, and the like. For example, the configuration information related to the CSI may include configuration information related to CSI reporting (e.g., CSI-ReportConfig). That is, the UE may receive the configuration information related to CSI reporting. The configuration information related to one or more CSI reportings (e.g., CSI-ReportConfig) may be configured to the UE. The configuration information related to CSI reporting (e.g., CSI-ReportConfig) may include information related to a time domain behavior of the CSI reporting (e.g., reportConfigType). Based on the information related to the time domain behavior (e.g., reportConfigType), a CSI reporting behavior of a time domain may be configured by one of (i) periodic, (ii) semi-persistent, or (iii) aperiodic.

For example, the configuration information related to CSI reporting (e.g., CSI-ReportConfig) may include a reportQuantity parameter representing CSI related quantity for reporting. Reporting contents such as CRI, PMI, CQI, L1-RSRP, etc. may be configured through the reportQuantity parameter. The configuration information related to CSI reporting (e.g., CSI-ReportConfig) may include a periodicity and slot offset information of the CSI reporting.

For example, an operation of the base station (100/200 of FIGS. 13 to 17) in the step S1210 to transmit the configuration information may be implemented by a device of FIGS. 13 to 17 to be described below. For example, referring to FIG. 14, one or more processors 102 may control one or more transceivers 106 and/or one or more memories 104 so as to transmit the configuration information, and the one or more transceivers 106 may transmit the configuration information.

The base station may transmit a reference signal for CSI measurement to the UE, in S1220. For example, the reference signal may be a CSI-RS. The reference signal may be transmitted periodically, semi-persistently, or aperiodically.

For example, an operation of the base station (100/200 of FIGS. 13 to 17) in the step S1220 to transmit the reference signal may be implemented by the device of FIGS. 13 to 17 to be described below. For example, referring to FIG. 14, one or more processors 102 may control one or more transceivers 106 and/or one or more memories 104 so as to transmit the reference signal, and the one or more transceivers 106 may transmit the reference signal.

The base station may receive the CSI reporting from the UE, in S1230. For example, the CSI may be reported periodically, semi-persistently, or aperiodically. The CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), or L1-RSRP.

For example, the PMI may correspond to codebook indexes. The codebook indexes may include an index indicating selected antenna ports, an index indicating linear combination coefficients (e.g., phase coefficient, size coefficient), and the like.

The CSI may be measured based on the reference signal. For example, the CSI may be calculated based on the above-described proposed methods and/or embodiments (e.g., the Embodiments 1/2/3/4/5, etc.). For example, the CSI may be calculated using a codebook corresponding to a codebook type configured via information for a codebook included in the configuration information. For example, the codebook type may be configured as a port selection codebook based on the information for the codebook, and the UE may calculate the CSI based on the port selection codebook. The CSI may be calculated based on a codebook constructed based on multiple matrices (e.g., a first matrix and a second matrix). The codebook (e.g., the port selection codebook) may be constructed by a linear combination of the multiple matrices (e.g., the first matrix and the second matrix).

For example, the first matrix (e.g., Equation 7) may include a plurality of column vectors differently set for each polarization of antenna ports. Each row vector constructing the first matrix may include a specific element with a value of 1 and other elements with a value of 0. For example, the codebook constructed based on the first matrix may be used only for higher ranks in which a value of RI is 3 or more.

As another example, the first matrix (e.g., Equation 8) may include a plurality of column vectors including specific elements with a value of 1 and other elements with a value of 0. Ports may be selected with a specific step size based on elements of each column vector.

As another example, the first matrix (e.g., Equation 9) may include a plurality of column vectors differently set for each polarization of antenna ports. Each row vector constructing the first matrix may include a specific element with a value of 1 and other elements with a value of 0. Ports may be selected with a specific step size based on elements of each column vector. Accordingly, based on a codebook constructed based on the first matrix (e.g., Equation 9), the ports may differently selected for each polarization of antenna ports depending on the specific step size.

For example, the base station may transmit information about the specific step size to the UE.

For example, the CSI reporting for a higher rank (e.g., ranks 3 to 4) may be calculated using a specific value of L regardless of a value of L (the number of selected ports) that the base station sets via the information about the codebook.

For example, when the CSI based on the port selection codebook is reported, the CSI may include a codebook index (e.g., value of m) indicating the selected ports. In other words, the PMI included in the CSI may include information corresponding to a codebook index indicating the selected ports (i.e., antenna ports). For example, when each port selection is performed for each polarization of the antenna ports, at least one of the indexes corresponding to the PMI may be an index indicating the antenna port selected for each polarization.

For example, the codebook index (e.g., value of m) indicating the selected ports may be reported layer-commonly as one value, or reported per layer or per layer-group. In other words, the CSI may include selection information for the antenna ports selected per layer or per layer-group, and the selection information may correspond to the codebook index (e.g., value of m) indicating the selected ports. When the codebook index indicating the selected ports is reported per layer or per layer-group, a bit size (number of bits) for reporting the codebook index (i.e., selection information) indicating the selected ports may increase in proportion to the number of layers or the number of layer-groups.

For example, an operation of the base station (100/200 of FIGS. 13 to 17) in the step S1230 to receive the CSI reporting may be implemented by the device of FIGS. 13 to 17 to be described below. For example, referring to FIG. 14, one or more processors 102 may control one or more transceivers 106 and/or one or more memories 104 so as to receive the CSI reporting, and the one or more transceivers 106 may receive the CSI reporting.

As mentioned above, the above-described base station/UE signaling and operation (e.g., the Embodiments 1 to 5/FIG. 10/FIG. 11/FIG. 12, etc.) may be implemented by a device to be described below (e.g., FIGS. 13 to 17). For example, the base station may correspond to a first wireless device, and the UE may correspond to a second wireless device. In some cases, the reverse may also be considered.

For example, the above-described base station/UE signaling and operation (e.g., the Embodiments 1 to 5/FIG. 10/FIG. 11/FIG. 12, etc.) may be processed by one or more processors (e.g., 102 and 202) of FIGS. 13 to 17. The above-described base station/UE signaling and operation (e.g., the Embodiments 1 to 5/FIG. 10/FIG. 11/FIG. 12, etc.) may be stored in one or more memories (e.g., 104 and 204) in the form of a command/program (e.g., instruction, executable code) for running at least one processor (e.g., 102 and 202) of FIGS. 13 to 17.

For example, in a device comprising one or more memories and one or more processors operatively connected to the one or more memories, the one or more processors may be configured to allow the device to receive configuration information including information about a codebook, receive a reference signal, measure CSI based on the reference signal, and transmit the CSI. The CSI may be calculated based on a codebook constructed based on a first matrix and a second matrix, the first matrix may include a plurality of column vectors set differently for each polarization of antenna ports, and the CSI may include a precoding matrix indicator (PMI) corresponding to indexes of the codebook.

For example, in one or more non-transitory computer readable mediums storing one or more instructions, the one or more instructions executable by one or more processors allow a user equipment (UE) to receive configuration information including information about a codebook, receive a reference signal, measure CSI based on the reference signal, and transmit the CSI. The CSI may be calculated based on a codebook constructed based on a first matrix and a second matrix, the first matrix may include a plurality of column vectors set differently for each polarization of antenna ports, and the CSI may include a precoding matrix indicator (PMI) corresponding to indexes of the codebook.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system applied to the present disclosure.

Referring to FIG. 13, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless dev ices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 1020} and/or {the wireless device 1010x and the wireless device 1010x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit to which the Present Disclosure is Applied

FIG. 15 illustrates a signal processing circuit for a transmit signal.

Referring to FIG. 15, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 2010 to 2060 may be implemented in the processors 102 and 202 of FIG. 14. Further, blocks 2010 to 2050 may be implemented in the processors 102 and 202 of FIG. 14 and the block 1060 of FIG. 15 and the block 2060 may be implemented in the transceivers 106 and 206 of FIG. 14.

A codeword may be transformed into a radio signal via the signal processing circuit 2000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 15. For example, the wireless device (e.g., 100 or 200 of FIG. 14) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of Wireless Device Applied to the Present Disclosure

FIG. 16 illustrates another example of a wireless device applied to the present disclosure. The wireless device may be implemented in various forms according to a use-case/service (see FIG. 13).

Referring to FIG. 16, wireless devices 1010 and 1020 may correspond to the wireless devices 100 and 200 of FIG. 14 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 14. For example, the transceiver(s) 114 may include the one or more transceivers 106 and 106 and/or the one or more antennas 108 and 108 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010a of FIG. 13), the vehicles (1010b-1 and 1010b-2 of FIG. 13), the XR device (1010c of FIG. 13), the hand-held device (1010d of FIG. 13), the home appliance (1010e of FIG. 13), the IoT device (1010f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (1020 of FIG. 13), a network node, etc. The wireless device may be used in a mobile or fixed place according to a use-example/service.

In FIG. 16, the entirety of the various elements, components, units/portions, and/or modules in the wireless devices 1010 and 1020 may be connected to each other through a wired interface or at least a part thereof may be wirelessly connected through the communication unit 110. For example, in each of the wireless devices 1010 and 1020, the control unit 120 and the communication unit 110 may be connected by wire and the control unit 120 and first units (e.g., 130 and 140) may be wirelessly connected through the communication unit 110. Each element, component, unit/portion, and/or module within the wireless devices 1010 and 1020 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 17 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 16, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, the wireless communication technology implemented in the wireless devices 1010 and 1020 of the disclosure may include the narrowband Internet of Things for low-power communication as well as LTE, NR, and 6G. In this case, e.g., the NB-IoT technology may be an example of low power wide area network (LPWAN) technology, and may be implemented in standards, such as LTE Cat NB1 and/or LTE Cat NB2, and it is not limited to the above-mentioned name. Additionally or alternatively, the wireless communication technology implemented in the wireless devices 1010 and 1020 of the disclosure may perform communication based on LTE-M technology. In this case, as an example, the LTE-M technology may be an example of LPWAN technology, and may be called by various names, such as enhanced machine type communication (eMTC). For example, LTE-M technology may be implemented as at least any one of various standards, such as 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 1010 and 1020 of the disclosure may include at least any one of ZigBee, Bluetooth, and Low Power Wide Area Network (LPWAN) considering low power communication, and it is not limited to the above-mentioned name. For example, the ZigBee technology may create personal area networks (PAN) related to small/low-power digital communication based on various standards, such as IEEE 802.15.4, and it may be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL AVAILABILITY

Although the method of transmitting and receiving PDSCH in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method performed by a user equipment (UE), the method comprising:
   receiving, from a base station (BS), configuration information including information for a codebook;
   receiving, from the BS, a channel state information reference signal (CSI-RS);
   measuring channel state information (CSI) based on the CSI-RS; and
   transmitting, to the BS, the CSI including a rank indicator (RI) and a precoding matrix indicator (PMI),
   wherein the CSI is measured based on the codebook including a linear combination based on multiple matrices,
   wherein a type of the codebook is configured as a port selection codebook based on the information for the codebook,
   wherein at least one index of indices of the codebook related to the PMI is an index representing antenna ports selected for each polarization of antenna ports,
   wherein the antenna ports are selected at regular intervals based on a specific step size, and
   wherein the codebook is used based on a value of the RI being 3 or more.

2. The method of claim 1,
   wherein a first matrix of the codebook includes a plurality of column vectors set differently for each polarization of the antenna ports.

3. The method of claim 2,
   wherein the first matrix is W1 in Equation below, $$W_1 = \begin{bmatrix} E_{\frac{X}{2} \times L} & 0 \\ 0 & E'_{\frac{X}{2} \times L} \end{bmatrix} \quad \text{[Equation]}$$

$$E_{\frac{X}{2} \times L} = \begin{bmatrix} e^{\left(\frac{X}{2}\right)}_{mod\left(md,\frac{X}{2}\right)} & e^{\left(\frac{X}{2}\right)}_{mod\left(md+n,\frac{X}{2}\right)} & \cdots & e^{\left(\frac{X}{2}\right)}_{mod\left(md+n(L-1),\frac{X}{2}\right)} \end{bmatrix}$$

$$E'_{\frac{X}{2} \times L} = \begin{bmatrix} e^{\left(\frac{X}{2}\right)}_{mod\left(m'd,\frac{X}{2}\right)} & e^{\left(\frac{X}{2}\right)}_{mod\left(m'd+n,\frac{X}{2}\right)} & \cdots & e^{\left(\frac{X}{2}\right)}_{mod\left(m'd+n(L-1),\frac{X}{2}\right)} \end{bmatrix}$$

where (i) the X is the number of antenna ports, (ii) the L is the number of selected antenna ports, (iii) the d is a value set from the BS, (iv) m and m' are parameters related to selection of the antenna ports, and (v) the n is a parameter related to the specific step size.

4. The method of claim 3,
   wherein at least one of the L, m, and d parameters is a value used for each layer or layer-group.

5. The method of claim 1,
   wherein the information for the codebook includes the number of beams used for the linear combination and size information of the port selection codebook.

6. The method of claim 5,
   wherein the number of the selected antenna ports is determined based on a specific value determined, by the UE, regardless of the number of beams used for the linear combination included in the information for the codebook.

7. The method of claim 1, further comprising:
   receiving, from the BS, information for the specific step size.

8. The method of claim 1,
wherein the specific step size is determined by the UE, and
wherein the CSI includes information for the specific step size.

9. The method of claim 1,
wherein the CSI includes selection information for antenna ports selected for each layer or layer-group.

10. The method of claim 9,
wherein the number of bits for reporting the selection information is proportional to the number of the layer groups, based on the selection of the antenna ports for each layer group.

11. A user equipment (UE) comprising:
at least one transceiver;
at least one processor; and
at least one memory coupled to the at least one processor and configured to store instructions for operations executed by the at least one processor,
wherein the operations comprise:
receiving, from a base station (BS), configuration information including information for a codebook;
receiving, from the BS, a channel state information reference signal (CSI-RS);
measuring channel state information (CSI) based on the CSI-RS; and
transmitting, to the BS, the CSI including a rank indicator (RI) and a precoding matrix indicator (PMI),
wherein the CSI is measured based on the codebook including a linear combination based on multiple matrices,
wherein a type of the codebook is configured as a port selection codebook based on the information for the codebook,
wherein at least one index of indices of the codebook related to the PMI is an index representing antenna ports selected for each polarization of antenna ports,
wherein the antenna ports are selected at regular intervals based on a specific step size, and
wherein the codebook is used based on a value of the RI being 3 or more.

12. A method performed by a base station (BS), the method comprising:
transmitting, to a user equipment (UE), configuration information including information for a codebook;
transmitting, to the UE, a channel state information reference signal (CSI-RS); and
receiving, from the UE, channel state information (CSI) including a rank indicator (RI) and a precoding matrix indicator (PMI),
wherein the CSI is measured based on the codebook including a linear combination based on multiple matrices,
wherein a type of the codebook is configured as a port selection codebook based on the information for the codebook,
wherein at least one index of indices of the codebook related to the PMI is an index representing antenna ports selected for each polarization of antenna ports,
wherein the antenna ports are selected at regular intervals based on a specific step size, and
wherein the codebook is used based on a value of the RI being 3 or more.

* * * * *